US007174395B2

(12) United States Patent
Sugiyama

(10) Patent No.: US 7,174,395 B2
(45) Date of Patent: Feb. 6, 2007

(54) COMMUNICATION INTERFACE METHOD AND DEVICE UTILIZING DIRECT MEMORY ACCESS DATA TRANSFER

(75) Inventor: Koichi Sugiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 765 days.

(21) Appl. No.: 10/182,866

(22) PCT Filed: Dec. 3, 2001

(86) PCT No.: PCT/JP01/10537

§ 371 (c)(1),
(2), (4) Date: Aug. 1, 2002

(87) PCT Pub. No.: WO02/46939

PCT Pub. Date: Jun. 13, 2002

(65) Prior Publication Data
US 2003/0014547 A1 Jan. 16, 2003

(30) Foreign Application Priority Data
Dec. 4, 2000 (JP) ............................. 2000-368363

(51) Int. Cl.
G06F 13/28 (2006.01)
G06F 13/38 (2006.01)
(52) U.S. Cl. ........................ 710/22; 710/23; 710/33; 710/305
(58) Field of Classification Search ................. 710/22, 710/23, 28, 33, 305; 709/212; 711/100
See application file for complete search history.

(56) References Cited

U.S. PATENT DOCUMENTS 5,991,817 A 11/1999 Rowett et al.

6,333,938 B1 * 12/2001 Baker .......................... 370/503
6,691,178 B1 * 2/2004 Kasper ......................... 710/22

(Continued)

FOREIGN PATENT DOCUMENTS

EP 0 803 819 10/1997

(Continued)

Primary Examiner—Ilwoo Park
(74) Attorney, Agent, or Firm—Frommer Lawrence & Haug LLP; William S. Frommer; Thomas F. Presson

(57) ABSTRACT

In asynchronous communication, an efficient data transfer can be performed between an external bus and an internal bus. A packet obtained from the external bus by the asynchronous communication is stored into first memory means. The packet in the first memory means is transferred to second memory means via the internal bus. Data obtained by decomposing the packet stored in the second memory means is transferred to an internal signal processing system. Contrarily, the data from the internal signal processing system is packetized and transferred to the second memory means and transferred to third memory means. The transfer between the first memory means and the second memory means and the transfer between the second memory means and the third memory means are set to DMA transfer. Top information indicating that the first unit data of the DMA transfer is a top of the packet or not and end information indicating that the last unit data is an end of the packet or not are set into a control register for the DMA transfer. The DMA transfer is executed in accordance with the setting in the control register. The top information and the end information are reflected to a transfer destination of the DMA transfer.

7 Claims, 18 Drawing Sheets

U.S. PATENT DOCUMENTS

RE38,821 E * 10/2005 Shemla et al. .............. 370/402
2002/0188793 A1 * 12/2002 Hunsaker et al. ........... 710/310

FOREIGN PATENT DOCUMENTS

| JP | 10-285234 | 10/1998 |
| JP | 11-341063 | 12/1999 |
| JP | 2000-134242 | 5/2000 |

* cited by examiner

CONTENTS IN DMA CONTROL REGISTER
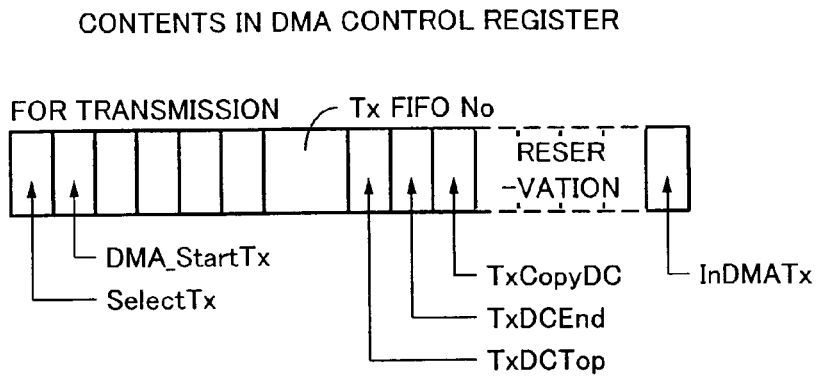
Fig. 4A
Fig. 4B
CONTENTS IN REGISTER OF THE
NUMBER OF DMA TRANSFER DATA
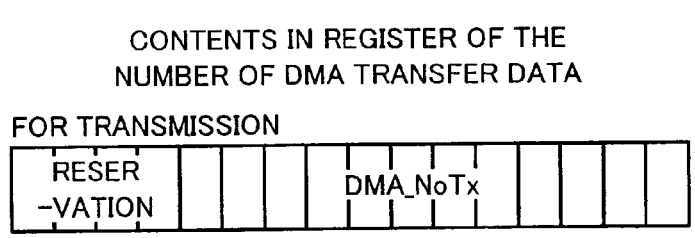
Fig. 5A
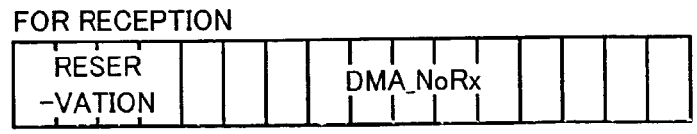
Fig. 5B

COMMUNICATION INTERFACE METHOD AND DEVICE UTILIZING DIRECT MEMORY ACCESS DATA TRANSFER

TECHNICAL FIELD

The invention relates to data transmitting method and apparatus and communication interface method and apparatus which are suitable for use in data transfer between a serial bus of, for example, the IEEE (The Institute of Electrical and Electronics Engineers, Inc.) 1394 bus standard and an internal circuit of an electronic apparatus.

BACKGROUND ART

The IEEE1394 bus standard has been known as a serial bus standard for transmitting and receiving digital data. According to the IEEE1394 bus standard, there are isochronous transmission as synchronous communication and asynchronous transmission as asynchronous communication. According to the IEEE1394-1995 standard, it has been defined that the isochronous transmission is used for realtime transmission of data such as video data or audio data and the asynchronous transmission is used for transmission of other state data, control data, or the like.

FIG. 1 is a block diagram of an example of a conventional IEEE1394 interface apparatus. The interface apparatus of such an example is constructed as an IC.

An interface apparatus 10 of such an example comprises: a physical layer circuit 11 for connecting to an IEEE1394 bus; a link core circuit 12; an asynchronous transmission FIFO (First In First Out) memory 13; an asynchronous reception FIFO memory 14; a configuration register 15; a host bus interface unit 16; an isochronous transmission FIFO memory 17; an isochronous transmission and reception FIFO memory 18; an encrypting circuit 19; and an application interface unit 20.

The link core circuit 12 comprises: a transmitter 21; a receiver 22; a cycle timer 23; a CRC (Cyclic Redandundancy Check) circuit 24; and a cycle monitoring circuit 25.

The host bus interface unit 16 is used for, when it is implemented into an electronic apparatus, allowing a CPU in the electronic apparatus to be connected as a host computer. The host computer accesses the asynchronous transmission FIFO memory 13, asynchronous reception FIFO memory 14, and configuration register 15 via the host bus interface unit 16 and performs asynchronous communication.

For the purpose of making isochronous communication, the interface apparatus 10 has therein two FIFO memories, that is, the isochronous transmission FIFO memory 17 and isochronous transmission and reception FIFO memory 18 and can perform 2-channel simultaneous transmission and reception and isochronous simultaneous transmission and reception. Owing to the existence of the encrypting circuit 19, an encrypting process can be performed with respect to each of the two FIFO memories 17 and 18.

The application interface unit 20 has a function for enabling an MPEG (Moving Picture Experts Group) 2 transport stream, an IEC (International Electrotechnical Commission) 958 audio stream, or the like to be communicated as an isochronous packet.

In the newly extended IEEE1394 bus standard (1394a), on the other hand, video data and audio data can be transmitted also by the asynchronous asynchronous transmission. It is called an asynchronous stream.

As mentioned above, in the conventional interface apparatus 10, in the asynchronous communication, the CPU in the electronic apparatus functions as a host computer, accesses the asynchronous transmission FIFO memory 13, asynchronous reception FIFO memory 14, and configuration register 15, and performs asynchronous communication.

Therefore, also with respect to the asynchronous stream, if it is intended to likewise performs asynchronous communication by an access of the host computer, when a data size is large or the like, a burden on the host computer becomes very heavy.

In the IEEE1394 interface circuit which handles the asynchronous stream, as mentioned above, it is necessary that packet data fetched from the IEEE1394 bus is once fetched into the buffer memory for reception, the fetched packet data is transferred to another memory, thereafter, packet-decomposed, and transferred to an internal signal processing system, and data from the internal signal processing system is fetched into a predetermined memory, packetized, thereafter, transferred to the buffer memory for transmission, and sent from the buffer memory for transmission to the IEEE1394 bus.

In this case, according to the IEEE1394 bus standard, since the data is transmitted on a unit basis of a packet consisting of a data amount of, for example, 512 to 2048 bytes, for instance, in case of transmitting data of a still image as an asynchronous stream, data of a plurality of packets is ordinarily transmitted.

According to the IEEE1394 bus standard, in the interface apparatus 10, although it is necessary to transmit and receive the data on a quadlet (4 bytes) unit basis, a method of designating a range of the packet in case of transferring the data from the memory to the memory as mentioned above does not exist hitherto. Therefore, a method which is effective in the data transfer between the memories is demanded.

It is an object of the invention to provide data transmitting method and apparatus and communication interface method and apparatus which can solve the problems as mentioned above.

DISCLOSURE OF INVENTION

To solve the above problems, according to the invention of claim 1, there is provided a data transfer method of DMA (Direct Memory Access) transferring a packet comprising a plurality of unit data each consisting of a predetermined number of data from first memory means to second memory means every predetermined number of unit data, wherein top information indicating that the first unit data which is DMA-transferred from the first memory means to the second memory is a top of the packet and end information indicating that the last unit data which is DMA-transferred from the first memory means to the second memory is an end of the packet are set into a control register for the DMA transfer, the DMA transfer is executed in accordance with the setting in the control register, and when the top information has been set to be the top of the packet and the end information has been set to be the end of the packet, this fact is reflected to a transfer destination of the DMA transfer.

According to the invention of claim 1 of the above construction, the data transfer is executed at a high speed between the memories by the DMA transfer. The DMA transfer is executed on a unit data basis of the predetermined number of data. Instruction information indicating that the first unit data which is transferred is the top of the packet and that the last unit data which is transferred is the end of the packet can be set into the control register for DMA transfer of every unit data. Therefore, the data of the packet unit can be easily handled.

According to the invention of claim 2, in claim 1, addition transfer instruction information for instructing whether the information indicative of the top and/or the end of the packet stored in the memory means on a transferring source side is added and the DMA transfer is executed or not is set into the control register.

According to the invention of claim 2 of the above construction, since the information indicative of the top and/or the end of the packet stored in the memory means on the transferring source side is added and the DMA transfer can be executed, the transmission of the packet unit after the DMA transfer can be further performed.

According to the invention of claim 4, there is provided a data transfer apparatus for DMA (Direct Memory Access) transferring a packet comprising a plurality of unit data each consisting of a predetermined number of data from first memory means to second memory means every predetermined number of unit data, comprising:

a control register for the DMA transfer;

setting means for setting top information indicating that the first unit data of the DMA transfer is a top of the packet and end information indicating that the last unit data is an end of the packet into the control register; and means for executing the DMA in accordance with the setting in the control register, and when the top information has been set to be the top of the packet and the end information has been set to be the end of the packet, reflecting this fact to a transfer destination of the DMA transfer.

According to the invention of claim 4 of the above construction, the data transfer is executed at a high speed between the memories by the DMA transfer. The DMA transfer is executed on a unit data basis of the predetermined number of data. Instruction information indicating that the first unit data which is transferred is the top of the packet and that the last unit data which is transferred is the end of the packet can be set into the control register for DMA transfer of every unit data. Therefore, the data of the packet unit can be easily handled.

According to the invention of claim 5, in claim 4, the setting means sets addition transfer instruction information for instructing whether the information indicative of the top and/or the end of the packet stored in the memory means on a transferring source side is added and the transfer is executed or not into the control register.

According to the invention of claim 5 of the above construction, since the information which has been stored in the memory means on the transferring source side and indicates the top and/or the end of the packet is added and the DMA transfer can be executed, the transmission of the packet unit after the DMA transfer can be further performed.

According to the invention of claim 7, there is provided a communication interface method whereby a packet obtained from an external bus by asynchronous communication is stored into first memory means, the packet stored in the first memory means is transferred to second memory means via an internal bus, and data obtained by decomposing the packet stored in the second memory means is transferred to an internal signal processing system, the data from the internal signal processing system is packetized and stored into the second memory means, the packetized data stored in the second memory means is transferred to third memory means via the internal bus, and the data is asynchronously sent from the third memory means to the external bus, wherein each of the transfer between the first memory means and the second memory means and the transfer between the second memory means and the third memory means is a DMA transfer.

According to the invention of claim 7, the packet sent via the external bus by the asynchronous communication is stored into the first memory means and, thereafter, transferred to the second memory via the internal bus by the DMA transfer. The data stored in the second memory means is packet-decomposed and, thereafter, transferred to the internal signal processing system. The data from the internal signal processing system is packetized, stored into the second memory means, and transferred from the second memory means to the third memory means by the DMA transfer via the internal bus. The data is asynchronously sent from the third memory means to the external bus. Since the data transfer between the internal memory means is the DMA transfer, the high speed transfer can be performed, the transfer can be performed irrespective of a control of a control unit, and a burden on the control unit is lightened.

According to the invention of claim 8, in claim 7, the DMA transfer is executed every predetermined number of unit data each consisting of a predetermined number of data, top information indicating that the first unit data of the DMA transfer between the first memory means and the second memory means or between the second memory and the third memory means is a top of the packet and end information indicating that the last unit data is an end of the packet are set into a control register for the DMA transfer, the DMA transfer is executed in accordance with the setting in the control register, and when the top information has been set to be the top of the packet and the end information has been set to be the end of the packet, this fact is reflected to a transfer destination of the DMA transfer.

According to the invention of claim 8, the data transfer is executed at a high speed between the memories by the DMA transfer. The DMA transfer is executed on a unit data basis of the predetermined number of data. Instruction information indicating that the first unit data which is transferred is the top of the packet and that the last unit data which is transferred is the end of the packet can be set into the control register for DMA transfer of every unit data. Therefore, the data of the packet unit can be easily handled.

According to the invention of claim 9, in claim 8, addition transfer instruction information for instructing whether the information indicative of the top and/or the end of the packet stored in the memory means on a transferring source side is added and the DMA transfer is executed or not is set into the control register.

According to the invention of claim 9, since the information indicative of the top and/or the end of the packet stored in the memory means on the transferring source side is added and the DMA transfer can be executed, the transmission of the packet unit after the DMA transfer can be further performed.

According to the invention of claim 10, in any one of claims 7 to 9, the external bus is a serial bus of the IEEE (The Institute of Electrical and Electronics Engineers, Inc.) 1394 bus standard.

According to the invention of claim 10, the data transfer using the IEEE1394 bus as an external bus, that is, the asynchronous data transfer of the asynchronous stream is preferably executed.

According to the invention of claim 13, there is provided a communication interface apparatus comprising:

an internal bus;

first memory means, provided between the internal bus and an external bus, for storing a packet obtained from the external bus by asynchronous communication;

second memory means provided between the internal bus and an internal signal processing system;

third memory means, provided between the internal bus and the external bus, for sending the packet to the external bus by asynchronous communication;

a DMA controller for executing a transfer between the first memory means and the second memory means and a transfer between the second memory means and the third memory means by a DMA transfer;

a control register in which control information for controlling the DMA transfer is stored; and means for decomposing the packet transferred to the second memory means, storing the decomposed packet into the second memory means again, packetizing the data from the internal signal processing system stored in the second memory means, and storing the packetized data into the second memory means again.

According to the invention of claim 13, the packet sent via the external bus by the asynchronous communication is stored into the first memory means and, thereafter, transferred to the second memory via the internal bus by the DMA transfer. The data stored in the second memory means is packet-decomposed and, thereafter, transferred to the internal signal processing system. The data from the internal signal processing system is packetized, stored into the second memory means, and transferred from the second memory means to the third memory means via the internal bus by the DMA transfer. The data is asynchronously sent from the third memory means to the external bus.

Therefore, since the data transfer between the memories in the communication interface apparatus is executed by the DMA transfer based on the control of the DMA controller, the high speed transfer can be performed. A control unit in the communication interface apparatus can execute another job during the DMA transfer, or the like, so that a burden on the control unit is lightened.

According to the invention of claim 14, in claim 13, the DMA transfer is executed every predetermined number of unit data each consisting of a predetermined number of data, the apparatus has setting means for setting top information indicating that the first unit data of the DMA transfer is a top of the packet and end information indicating that the last unit data is an end of the packet into the control register, and the DMA controller executes the DMA transfer in accordance with the setting in the control register, and when the top information has been set to be the top of the packet and the end information has been set to be the end of the packet, the DMA controller reflects this fact to a transfer destination of the DMA transfer.

According to the invention of claim 14, the data transfer is executed at a high speed between the memories by the DMA transfer. The DMA transfer is executed on a unit data basis of the predetermined number of data. Instruction information indicating that the first unit data which is transferred is the top of the packet and that the last unit data which is transferred is the end of the packet can be set into the control register for DMA transfer of every unit data. Therefore, the data of the packet unit can be easily handled.

According to the invention of claim 15, in claim 14, the setting means sets addition transfer instruction information for instructing whether the information indicative of the top and/or the end of the packet stored in the memory means on a transferring source side is added and the DMA transfer is executed or not into the control register.

According to the invention of claim 15, since the information which has been stored in the memory means on the transferring source side and indicates the top and/or the end of the packet is added and the DMA transfer can be executed, the transmission of the packet unit after the DMA transfer can be further performed.

According to the invention of claim 16, in any one of claims 13 to 15, the external bus is a serial bus of the IEEE1394 bus standard.

According to the invention of claim 16, the data transfer using the IEEE1394 bus as an external bus, that is, the asynchronous data transfer of the asynchronous stream is preferably executed.

BRIEF DESCRIPTION OF DRAWINGS

FIG. 4 is a diagram for explaining the data transfer method in the embodiment of the communication interface apparatus in FIG. 2;

FIG. 5 is a diagram for explaining the data transfer method in the embodiment of the communication interface apparatus in FIG. 2;

BEST MODE FOR CARRYING OUT THE INVENTION

Figure 1:
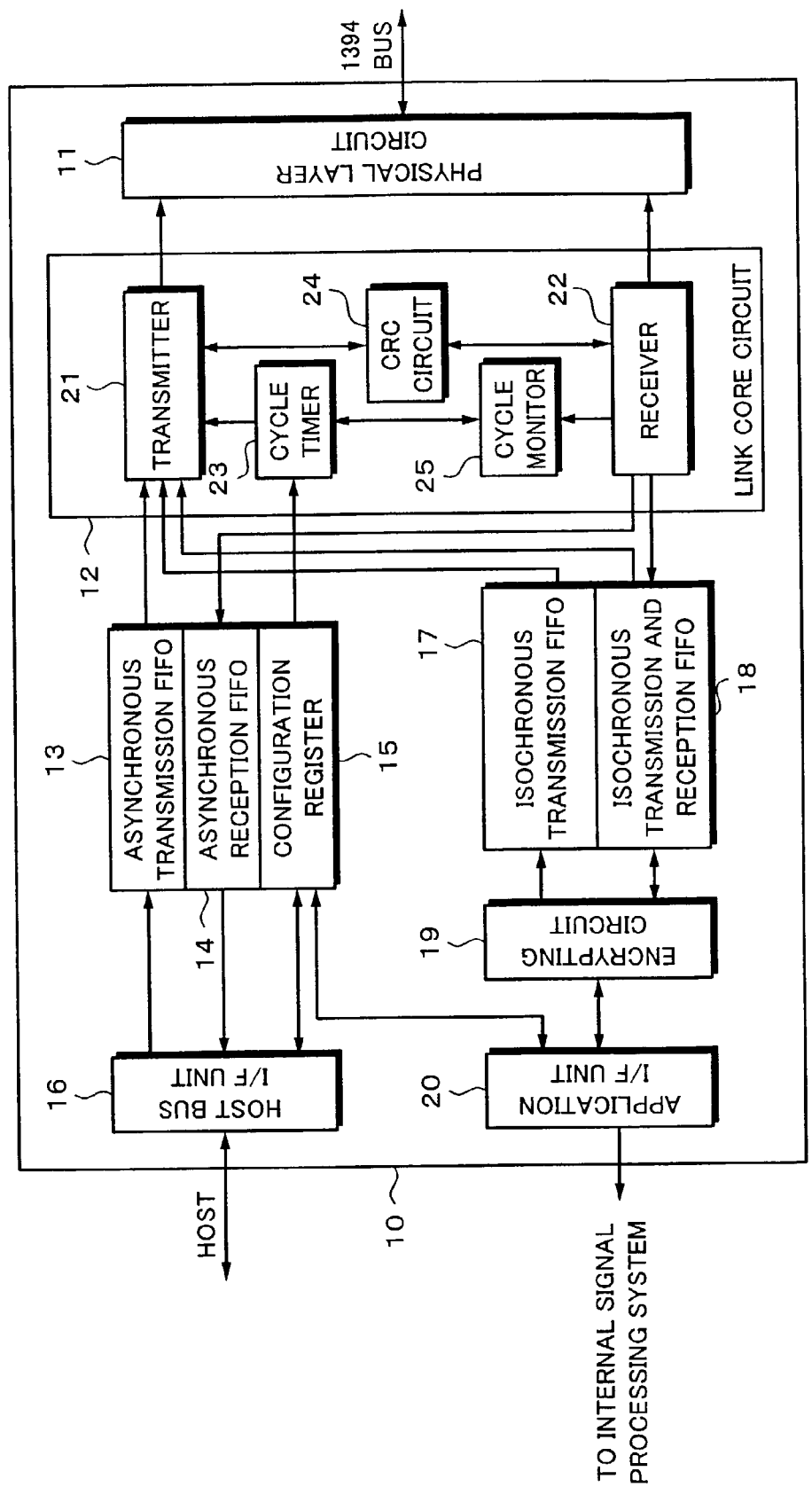
FIG. 1 is a block diagram showing an example of a conventional communication interface apparatus.
Figure 2:
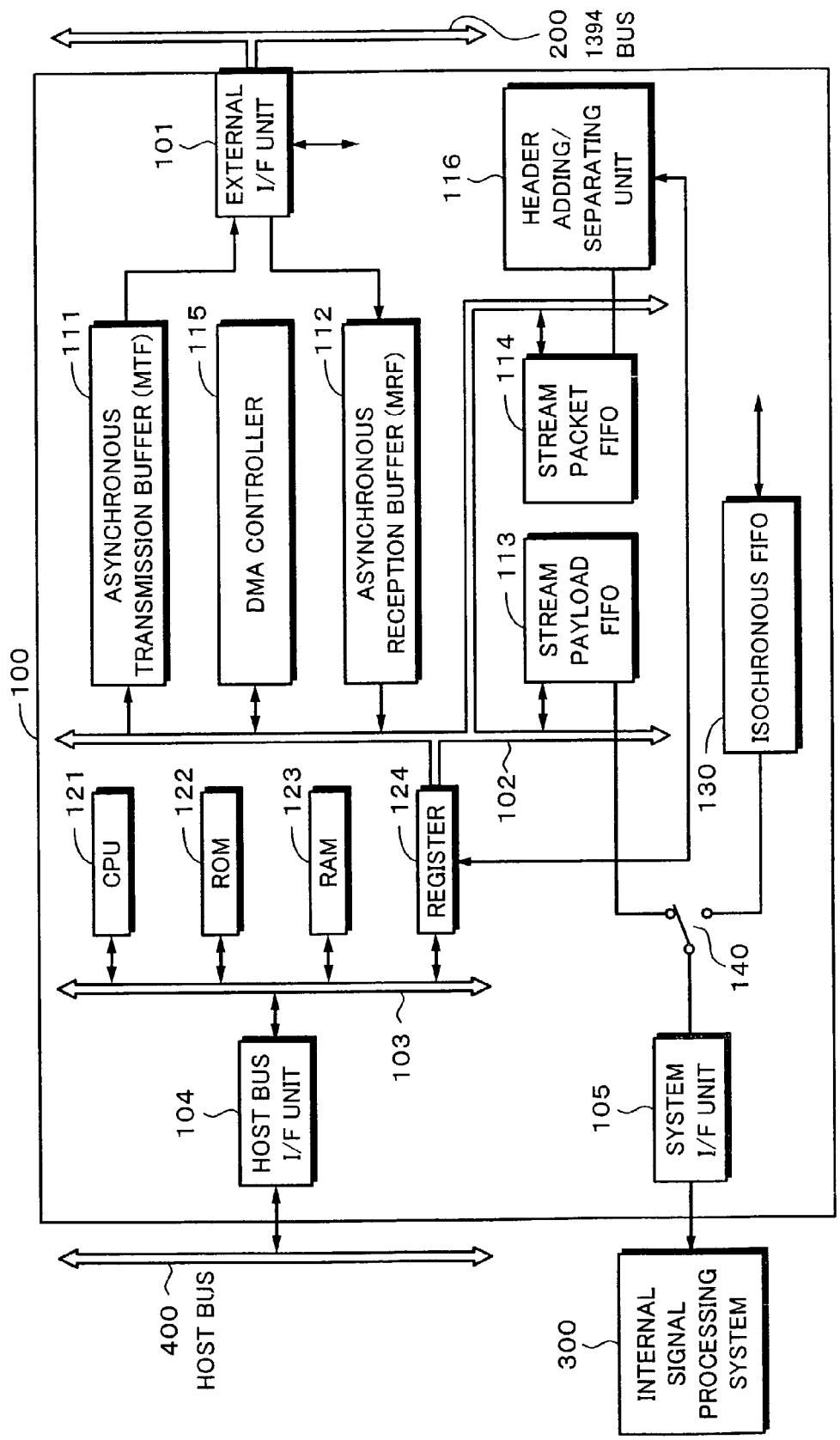
FIG. 2 is a diagram showing an embodiment of a communication interface apparatus according to the invention.

An embodiment of the invention will be described hereinbelow with reference to the drawings. FIG. 2 is a block diagram showing an embodiment of a communication interface apparatus according to the invention.

The embodiment of FIG. 2 relates to an example of a construction in case of an IEEE1394 interface apparatus 100 which is implemented in an electronic apparatus such as a video apparatus or the like and shows an example in the case where it is constructed as an IC circuit.

The IEEE1394 interface apparatus 100 in the embodiment executes interface processes among a serial bus of the IEEE1394 standard (hereinafter, simply referred to as an IEEE1394 bus) 200 as an external bus, an internal signal processing system 300 of the electronic apparatus, and a bus (host bus) 400 of a host computer in the electronic apparatus. The constructional example of FIG. 2 shows mainly a portion of asynchronous communication mainly as asynchronous communication.

In FIG. 2, the IEEE1394 interface apparatus 100 is connected to the IEEE1394 bus 200 by an external bus interface unit 101 including a physical layer circuit and a link core circuit.

The interface apparatus 100 has internal buses 102 and 103. The internal buses 102 and 103 are connected via a configuration register 124. The configuration register 124 includes a register for DMA control, which will be explained hereinlater, and other registers.

An asynchronous transmission buffer memory 111 and an asynchronous reception buffer memory 112 are connected between the external interface unit 101 and internal bus 102. A stream payload memory 113 and a stream packet memory 114 are connected to the internal bus 102. In the example, all of the memories 111 to 114 are constructed by FIFO (First In First Out) memories. In the following description, the asynchronous transmission buffer 111 is called MTF, the asynchronous reception buffer 112 is called MRF, the stream payload memory 113 is called a payload FIFO, and the stream packet memory 114 is called a packet FIFO, respectively.

Each data transfer between the FIFO memories 111 to 114 is assumed to be a DMA transfer as will be explained hereinlater. A DMA controller 115 for this purpose is connected to the internal bus 102 and provided.

The packet FIFO 114 is connected to a header adding/separating unit 116, separates a header from a packet fetched into the packet FIFO 114, and adds a header to data fetched into the packet FIFO. The header adding/separating unit 116 is connected to the register 124.

A CPU 121, a program ROM 122, and a work RAM 123 are connected to the internal bus 103 together with the configuration register 124. A host bus interface unit 104 is connected between the internal bus 103 and host bus 400 in the electronic apparatus.

Further, a system interface unit 105 is connected between the payload FIFO 113 and internal signal processing system 300. It corresponds to the conventional application interface unit. In case of this example, there is also a case where video data, audio data, and the like which are transmitted by the isochronous communication are sent to the internal signal processing system 300 via the system interface unit 105. Data which is transmitted from the internal signal processing system 300 by the isochronous communication is also sent via the system interface unit 105.

Therefore, in the example of FIG. 2, an isochronous transmission and reception FIFO memory 130 as a buffer for isochronous communication is provided. A switching circuit 140 is provided for the system interface unit 105 so as to be switched and connected to the isochronous FIFO 130 side in case of the isochronous communication and to the payload FIFO 113 side in case of the asynchronous communication. Although one isochronous transmission and reception FIFO memory 130 is shown in the example of the diagram, two FIFO memories are actually provided in a manner similar to the conventional technique.

The configuration register 124 includes a register for MTF-writing and a register for DMA control.

The register for MTF-writing is a register which is used at the time of writing the transfer data from the CPU 121 to the MTF 111 and comprises three registers: that is, a packet top register; a packet end register; and a packet intermediate register. The data written in the packet top register is handled as a top of the packet. The data written in the packet end register is handled as an end of the packet. The data written in the packet intermediate register is handled as intermediate data of the packet.

The register for DMA control is a register which is referred to when the DMA controller 115 executes the DMA transfer. Control data is written into this register and set by the CPU 121.

In case of the embodiment, the DMA transfer is considered with respect to the payload FIFO 113 as a center. By presuming the DMA transfer of the transmission from the payload FIFO 113 and the reception to this payload FIFO, all of necessary DMA transfers are defined.

Figure 3:
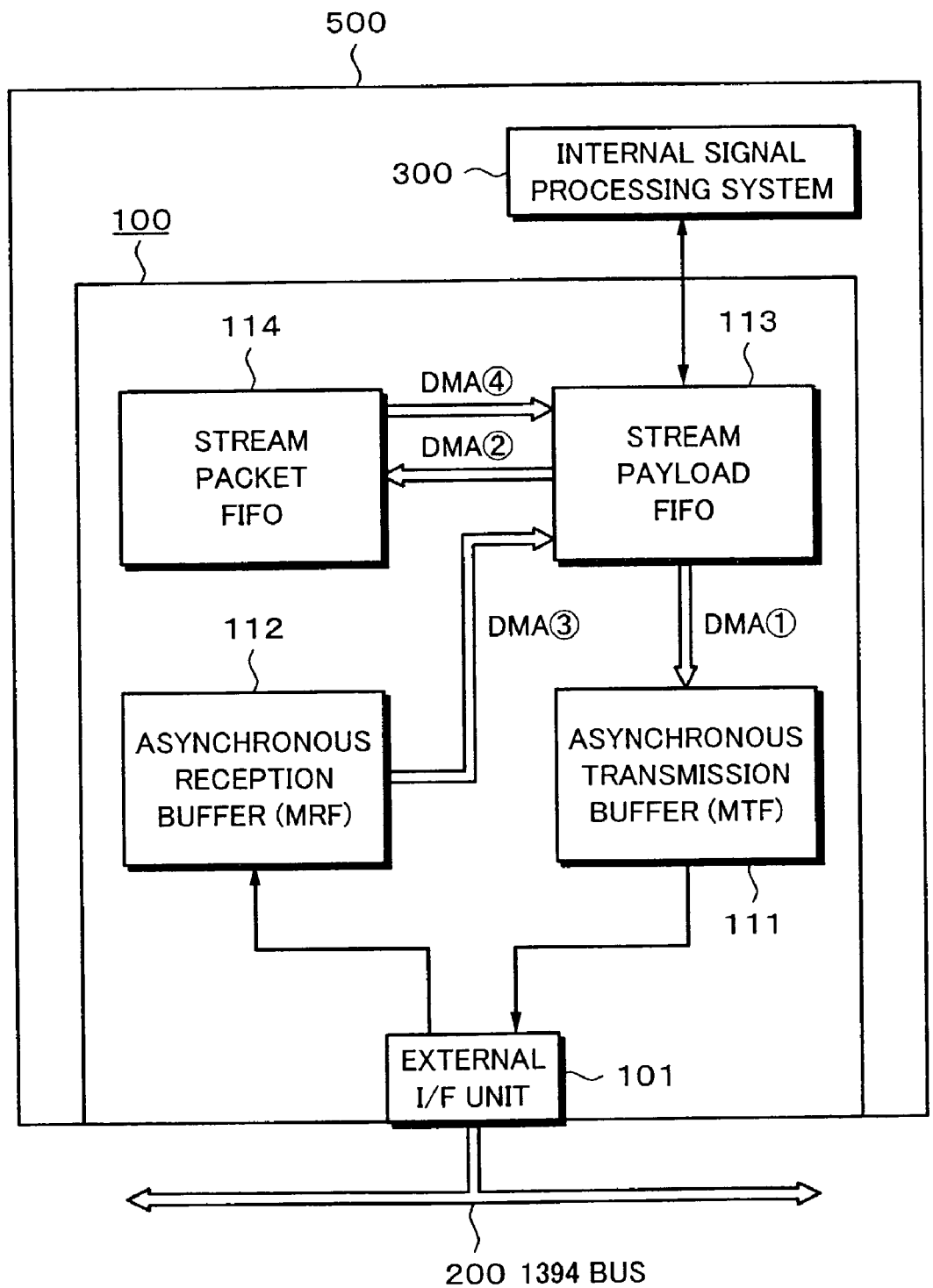
FIG. 3 is a diagram for explaining an outline of a data transfer method in the embodiment of the communication interface apparatus in FIG. 2.

That is, all of the DMA transfers which are executed in the embodiment are as shown in FIG. 3. As DMA transfers of the transmission from the payload FIFO 113, if two DMA transfers, that is, a DMA transfer to the MTF 111 (DMA ① in FIG. 3) and a DMA transfer to the packet FIFO 114 (DMA ② in FIG. 3) are considered, and as DMA transfers of the reception to the payload FIFO 113, if two DMA transfers, that is, a DMA transfer from the MRF 112 (DMA ③ in FIG. 3) and a DMA transfer from the packet FIFO 114 (DMA ④ in FIG. 3) are considered, all of the DMA transfers are included.

From such a viewpoint, in the embodiment, it is assumed that the register for DMA control includes: a control register for transmission and a control register for reception with respect to the payload FIFO 113; and a register of the number of DMA transfer data for transmission and a register of the number of DMA transfer data for reception.

FIG. 4 shows examples of contents of control data in the control register for transmission and the control register for reception in the payload FIFO 113. FIG. 5 shows examples of contents in the register of the number of DMA transfer data for transmission and the register of the number of DMA transfer data for reception.

FIG. 5A shows the control data which is set into the register of the number of DMA transfer data for transmission. DMA_NoTx denotes the number of unit data (Quadlet data) which is DMA-transferred from the payload FIFO 113. FIG. 5B shows the control data which is set into the register of the number of DMA transfer data for reception. DMA_NoRx denotes the number of unit data (Quadlet data) which is DMA-transferred.

FIG. 4A shows the control data which is set into the control register for transmission by the CPU 121. This control data consists of 16 bits. Among them, first one bit "SelectTx" is a bit for setting one of the two DMA transfers for transmission.

When SelectTx="1", it instructs the execution of the DMA transfer in the direction of payload FIFO 113→packet FIFO 114.

When SelectTx="0", it instructs the execution of the DMA transfer in the direction of payload FIFO 113→MTF 111.

When "1" is written into next one bit "DMA_StartTx", the DMA transfer of the quadlet data of the number designated by DMA_NoTx is started between the payload FIFO 113 and the packet FIFO 114/MRF 112. The bit "DMA_StartTx" is cleared at the end of the transfer and set to "0". By writing "0" into this bit during the transferring process, the transferring process can be immediately stopped.

Two bits of "TxFIFONo" designate the MTF 111 on the transfer destination side for performing the DMA transfer from the payload FIFO 113. That is, since the MTF 111 comprises a plurality of FIFO memories, to which one of the plurality of FIFO memories the data is transferred is designated. The bits "TxFIFONo" are valid only when "SelectTx"="0".

When next one bit "TxDCTop" is equal to "1" this means that the first unit data (Quadlet data) of the DMA transfer is a top of the packet. When the bit "TxDCTop" is equal to "1", the fact that the first unit data (Quadlet data) of the DMA transfer is the top of the packet is also reflected to the DMA transfer destination side.

When next one bit "TxDCEnd" is equal to "1", this means that the last unit data (Quadlet data) of the DMA transfer is an end of the packet. When the bit "TxDCEnd" is equal to "1", the fact that the last unit data (Quadlet data) of the DMA transfer is the end of the packet is also reflected to the DMA transfer destination side.

When next one bit "TxCopyDC" is equal to "1", this instructs the transmission of the DC information (Top, End) on the transmitting source side to the transfer destination side.

When last one bit "InDMATx" is equal to "1", this means that the DMA transferring process is being executed. The bit "InDMATx", set when the DMA transfer is started, is cleared when the DMA transfer is finished (including the stop).

FIG. 4B shows the control data which is set into the control register for reception by the CPU 121. This control data also consists of 16 bits. Among them, first one bit "SelectRx" is a bit for setting one of the two DMA transfers for reception.

When SelectRx="1", it instructs the execution of the DMA transfer in the direction of packet FIFO 114→payload FIFO 113.

When SelectRx="0", it instructs the execution of the DMA transfer in the direction of MRF 112→payload FIFO 113.

When "1" is written into next one bit "DMA_StartRx", the DMA transfer of the quadlet data of the number designated by DMA_NoRx is started between the packet FIFO 114/MRF 112 and the payload FIFO 113. The bit "DMA_StartRx" is cleared at the end of the transfer and set to "0". By writing "0" into this bit during the transferring process, the transferring process can be immediately stopped.

When the bit "RxDCTop" is equal to "1", this means that the first unit data (Quadlet data) of the DMA transfer is a top of the packet. When the bit "RxDCTop" is equal to "1", the fact that the first unit data (Quadlet data) of the DMA transfer is the top of the packet is reflected to the DMA transfer destination side.

When next one bit "RxDCEnd" is equal to "1", this means that the last unit data (Quadlet data) of the DMA transfer is an end of the packet. When the bit "RxDCEnd" is equal to "1", the fact that the last unit data (Quadlet data) of the DMA transfer is the end of the packet is also reflected to the DMA transfer destination side.

When next one bit "RxCopyDC" is equal to "1", this instructs the transmission of the information indicating the top and end of the packet on the transmitting source side (hereinafter, this information is referred to as DC information) to the transfer destination side.

When last one bit "InDMARx" is equal to "1", this means that the DMA transferring process is being executed. The bit "InDMARx", set when the DMA transfer is started, it is cleared when the DMA transfer is finished (including the stop).

Figure 6:
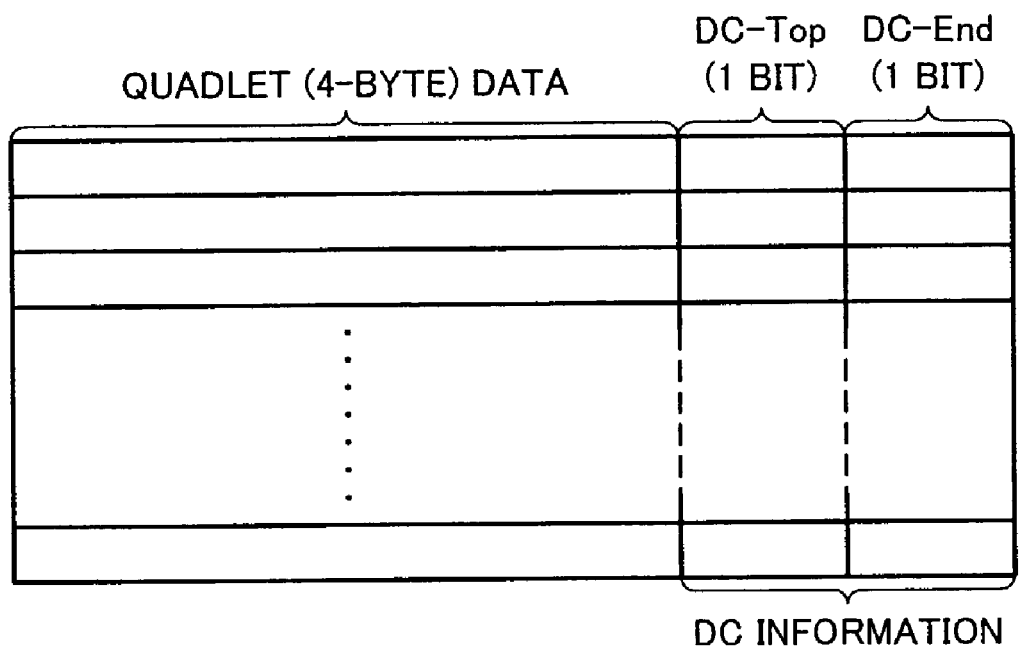
FIG. 6 is a diagram for explaining data stored in a memory in the embodiment of the communication interface apparatus in FIG. 2.

FIG. 6 shows a structure of the storage data in the FIFO memories 111, 112, 113, and 114. That is, the data is stored into each of the FIFO memories 111 to 114 on a quadlet data unit basis. DC information consisting of information DC_Top or DC_End indicative of the top or end of the packet has been added every quadlet data unit. The reflection of the top or end of the packet at the time of the DMA transfer mentioned above corresponds to the writing of the DC information.

The operation of the IEEE1394 interface apparatus with the construction as mentioned above will be described hereinbelow.

First, when the isochronous communication is made, the switching circuit 140 is switched to the isochronous FIFO memory 130 side. The isochronous packet received from the IEEE1394 bus 200 is fetched via the external interface unit 101, stored into the isochronous FIFO memory 130, and packet-decomposed. The data read out from the isochronous FIFO memory 130 is transferred to the internal signal processing system 300 via the switching circuit 140 and system interface unit 105.

The data from the internal signal processing system 300 is transferred to the isochronous FIFO memory 130 via the system interface unit 105 and switching circuit 140 and stored. The data in the isochronous FIFO memory 130 is sent as an isochronous packet to the IEEE1394 bus 200 via the external interface unit 101.

Subsequently, asynchronous communication will be described. In the embodiment, in the case where the asynchronous communication is made and a size of data is large, for example, like still image data or the like, data communication of an asynchronous stream is made. In case of communication of other control data or state data, the asynchronous communication similar to the conventional communication is made.

Whether the data which is transmitted from the IEEE1394 interface apparatus 100 is set to the asynchronous stream or the data according to another asynchronous communication is, for example, instructed by the host computer via the host bus 400. When the data size is large, the host computer discriminates the data size of the data to be transmitted by the asynchronous communication. When the data size is large, the host computer instructs to perform communication by the asynchronous stream.

For example, it is also possible to construct in a manner such that the kind of data such as still image data, audio data, or the like to be communicated by the asynchronous stream is predetermined, when the data is transmitted by the asynchronous communication, the host computer discriminates the kind of data and instructs whether the communication by the asynchronous stream is made or not on the basis of a result of the discrimination.

Whether the received data is data of the asynchronous stream or other data can be discriminated by the packet header.

In the IEEE1394 interface apparatus 100, when the data of the asynchronous stream is handled, that is, in the case where the data size is large or in case of the data of the predetermined kind, the DMA transfer is performed between the FIFO memories 111 to 114.

An outline of a flow of transmission and reception of the data of the asynchronous stream which are executed by the asynchronous communication in the IEEE1394 interface apparatus 100 will now be explained.

According to the interface apparatus 100 of the embodiment, in the asynchronous stream, it is assumed that a motion image video signal compressed by the MPEG (Moving Picture Experts Group) 2 system or DV (Digital Video) system or a still image video signal compressed by the JPEG (Joint Photographic Experts Group) system is transmitted on a packet unit basis of a predetermined size.

FIG. 3 mentioned above is also a diagram for explaining the flow of the data in such a case. First, a flow in case of receiving the data from the IEEE1394 bus 200 will be described. The IEEE1394 interface apparatus 100 is provided in an electronic apparatus 500. The internal signal processing system 300, host bus 400, and host computer are provided in the electronic apparatus 500.

The asynchronous stream sent via the IEEE1394 bus 200 is stored into the MRF 112 via the external bus interface unit 101. The packet data stored in the MRF 112 is DMA-transferred to the payload FIFO 113 on the basis of a control of the DMA controller 115. The DMA transfer at this time is executed on a 4-byte unit basis, that is, on a quadlet data unit basis. Also in other DMA transfers, which will be explained hereinlater, all of the data transfers are executed on a quadlet data unit basis.

Subsequently, the packet data stored in the payload FIFO 113 is DMA-transferred to the packet FIFO 114 on the basis of the control of the DMA controller 115. With respect to the data stored in the packet FIFO 114, the packet header is separated by the header adding/separating unit 116 and interpreted by the CPU 121 via the register 124.

The packet-decomposed data is DMA-transferred from the packet FIFO 114 to the payload FIFO 113. The data is transferred from the payload FIFO 113 to the internal signal processing system 300 via the switching circuit 140 and system interface unit 105.

It is unnecessary that the DMA transfer between the FIFO memories 111 to 114 is finished by one packet but the DMA transfer can be performed every unit obtained by collecting a plurality of packets or can be also performed on a unit basis of a unit obtained by dividing one packet.

Figure 7:
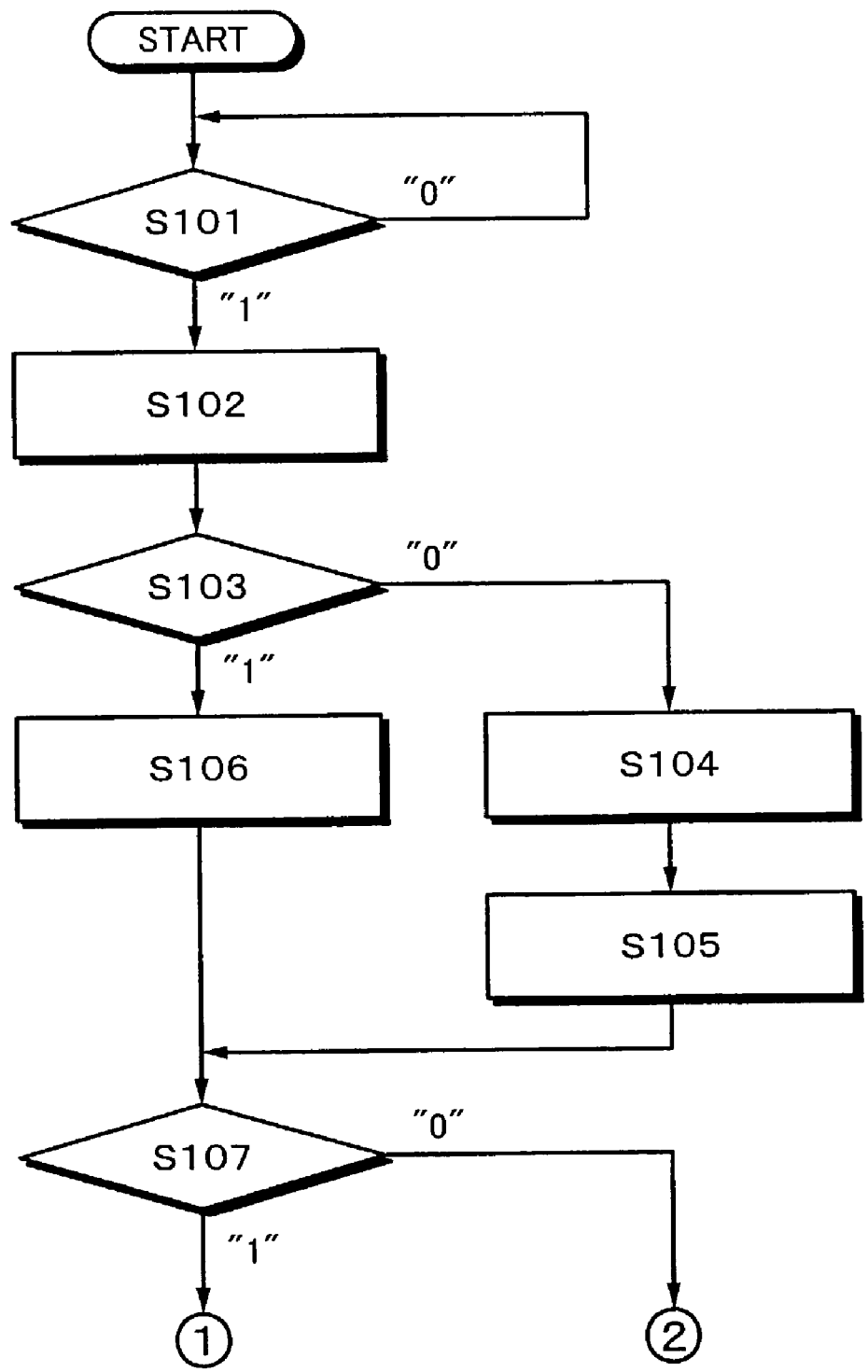
FIG. 7 is a part of a flowchart for explaining a DMA transfer in the embodiment of the communication interface apparatus in FIG. 2.
Figure 8:
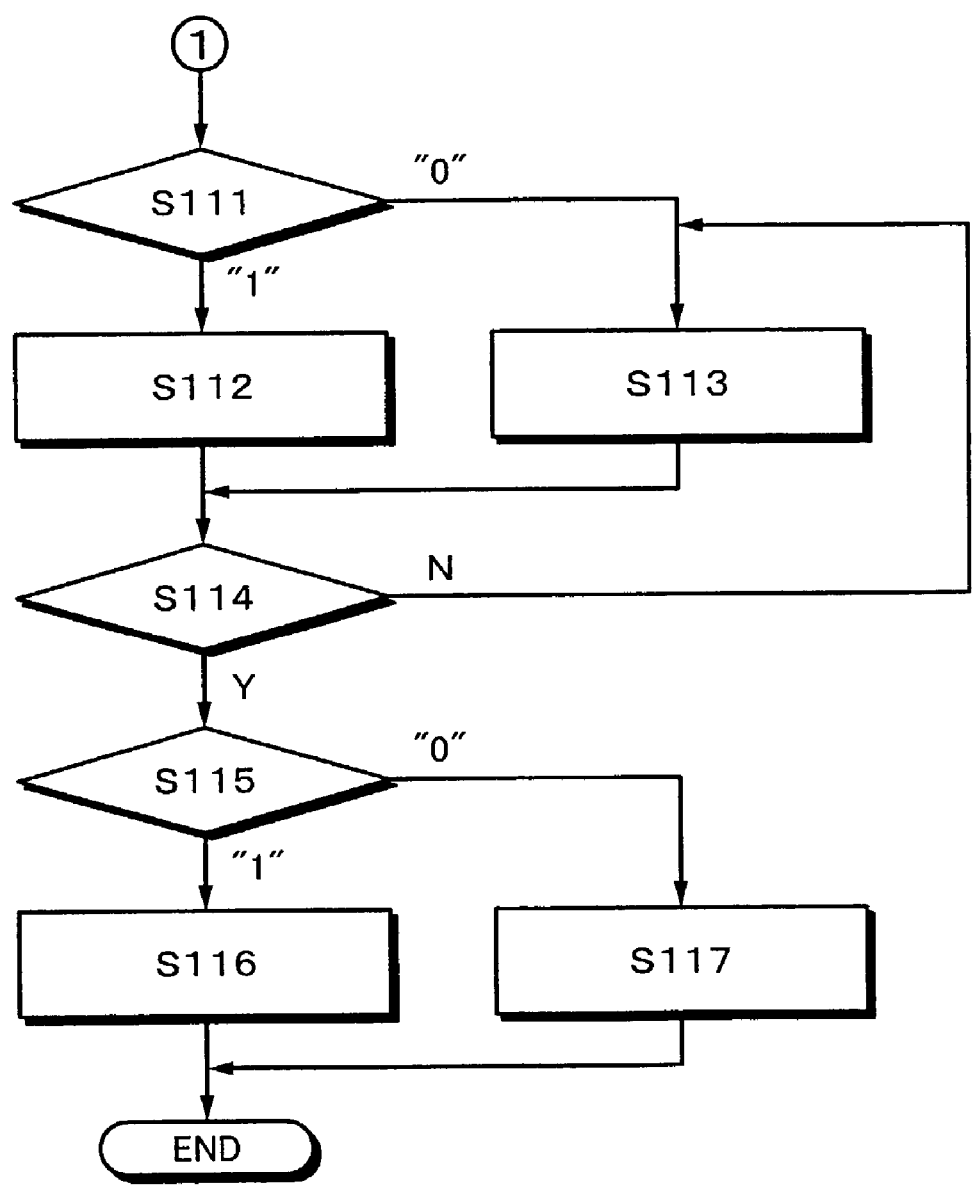
FIG. 8 is a part of the flowchart for explaining the DMA transfer in the embodiment of the communication interface apparatus in FIG. 2.
Figure 9:
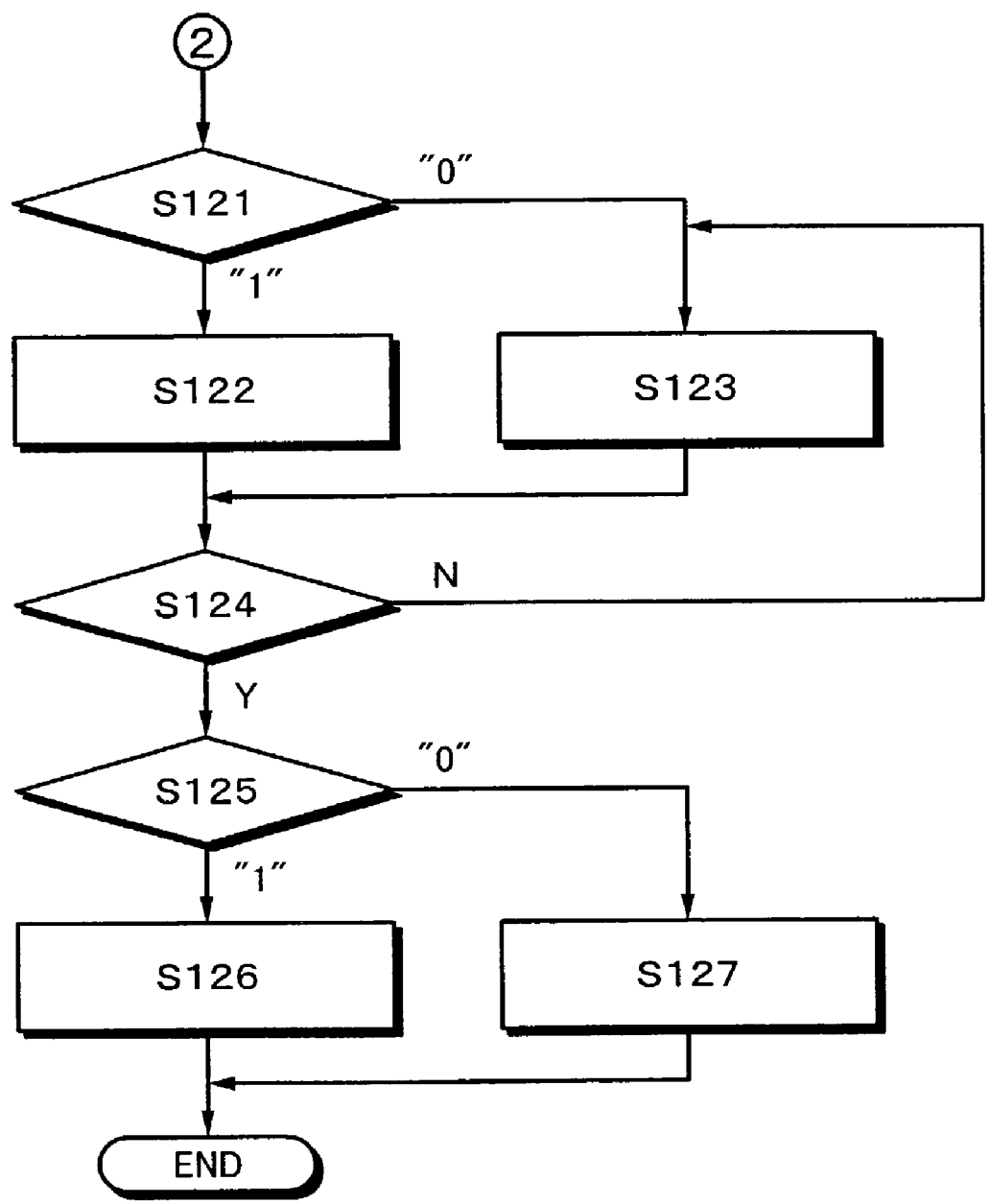
FIG. 9 is a part of the flowchart for explaining the DMA transfer in the embodiment of the communication interface apparatus in FIG. 2.
Figure 10:
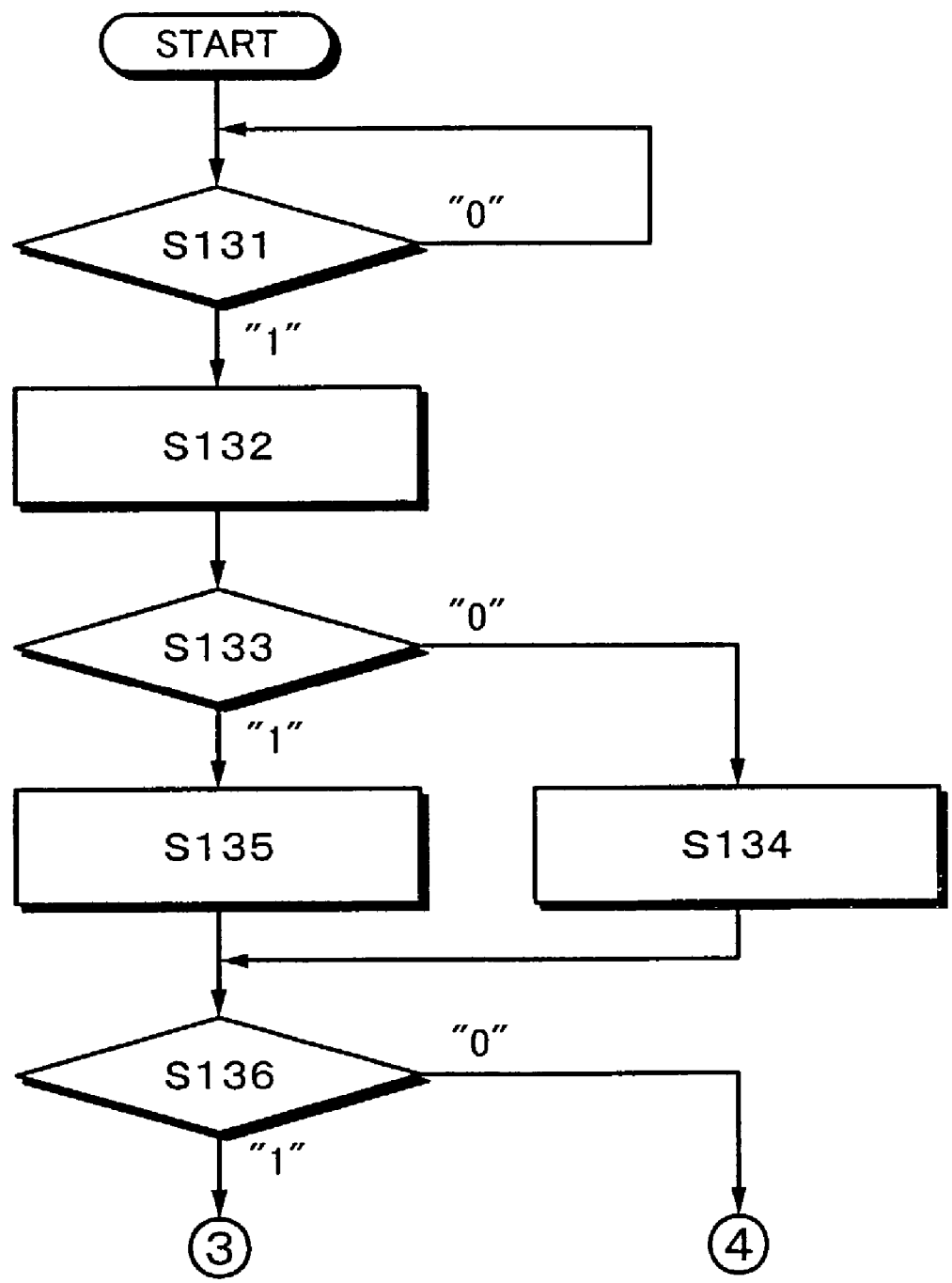
FIG. 10 is a part of the flowchart for explaining the DMA transfer in the embodiment of the communication interface apparatus in FIG. 2.
Figure 11:
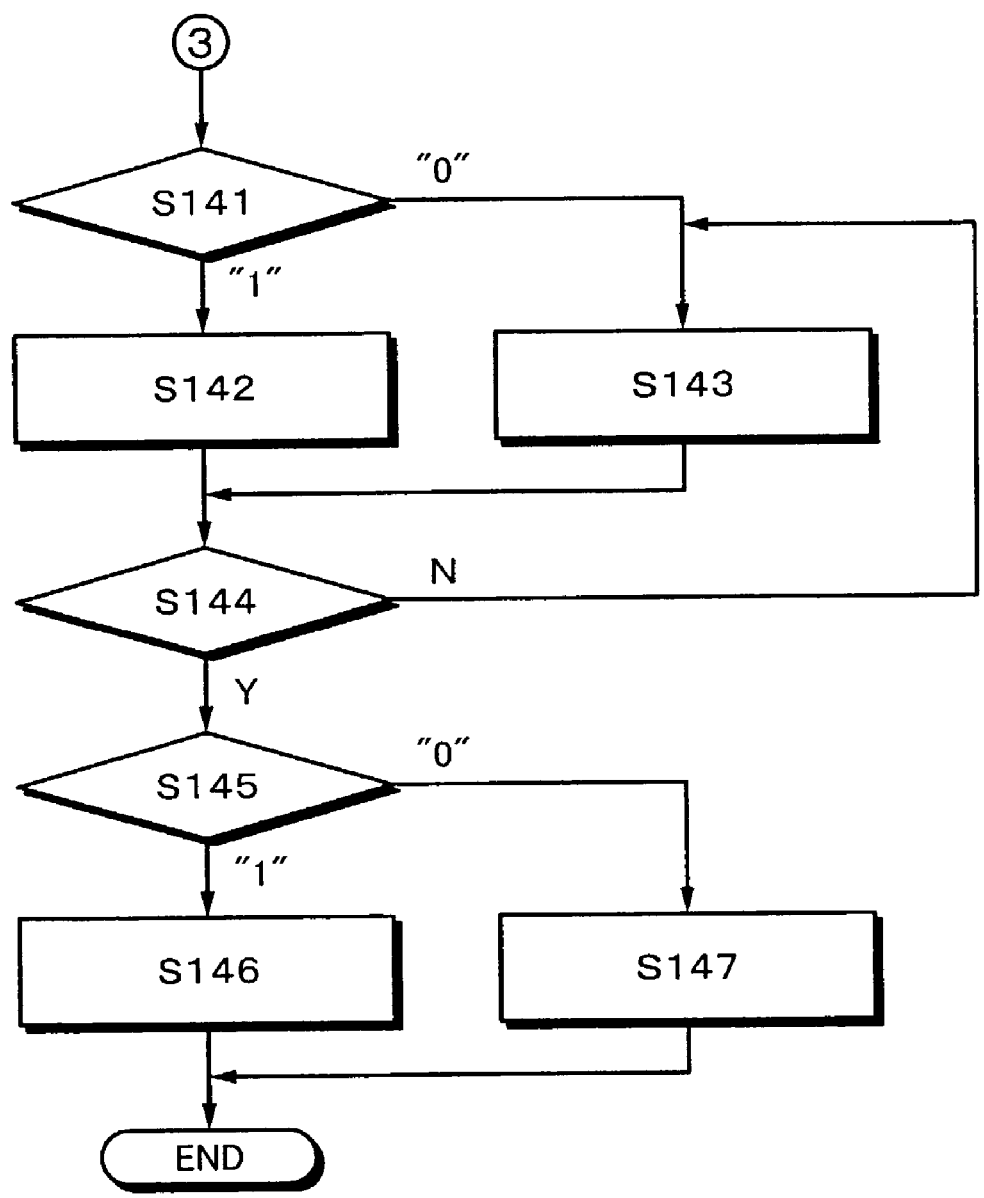
FIG. 11 is a part of the flowchart for explaining the DMA transfer in the embodiment of the communication interface apparatus in FIG. 2.
Figure 12:
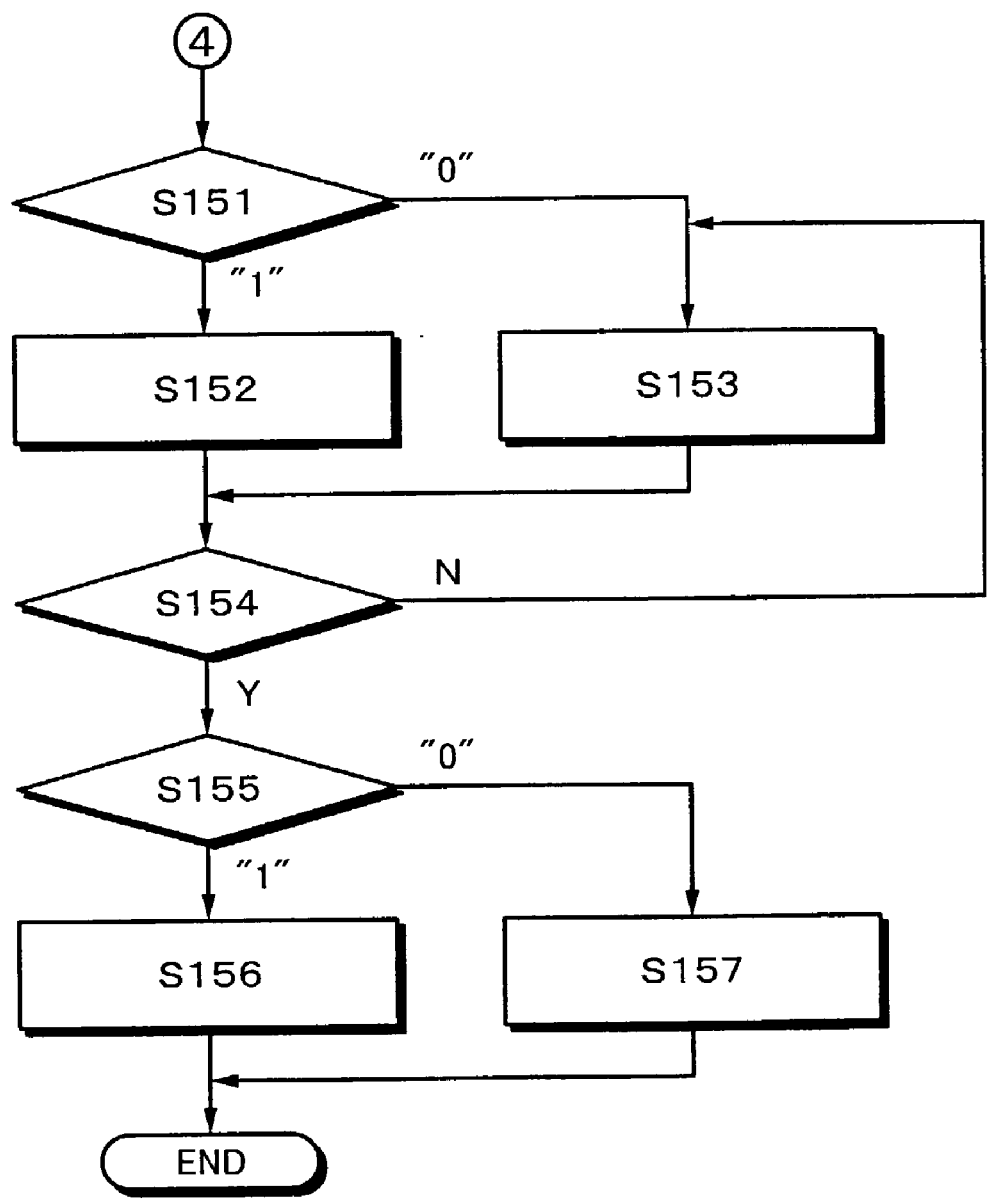
FIG. 12 is a part of the flowchart for explaining the DMA transfer in the embodiment of the communication interface apparatus in FIG. 2.

The control operation of the DMA controller 115 upon DMA transfer will be described hereinbelow with reference to FIGS. 7 to 12. FIGS. 7 to 9 are flowcharts for the control operation of the DMA controller 115 for DMA transfer in case of the transmission from the payload FIFO 113. FIGS. 10 to 12 are flowcharts for the control operation of the DMA controller 115 for DMA transfer in the case where the payload FIFO 113 serves as a reception side.

First, the case of the transmission in FIGS. 7 to 9 will be described. The DMA controller 115 refers to the bit "DMA_startTx" in the control register for transmission (step S101). When it is confirmed that the bit "DMA_startTx" is equal to "1", it is recognized that the DMA transfer in the direction of transmitting from the payload FIFO 113 is executed. The number of quadlet data which is DMA-transferred is confirmed with reference to "DMA_NoTx" in the DMA transfer data register for transmission (step S102).

Subsequently, the bit "SelectTx" in the control register for transmission is referred to (step S103). If the bit "SelectTx" is equal to "0", the FIFO of the MTF 111 on the transmission destination side is confirmed with reference to "TxFIFONo" (step S104), thereby starting the DMA transfer in the direction from the payload FIFO 113 to the MTF 111 (step S105).

If the bit "SelectTx" is equal to "1", the DMA transfer in the direction from the payload FIFO 113 to the packet FIFO 114 is started (step S106).

After completion of steps S105 and S106, the bit "TxCopyDC" in the control register for transmission is referred to (step S107). If the bit "TxCopyDC" is equal to "1", it is recognized that this means that the DC information on the transferring source side is transferred to the transfer destination side together with the quadlet data, and processes shown in FIG. 8 are executed. If the bit "TxCopyDC" is equal to "0", it is recognized that this means that the DC information on the transferring source side is not transferred to the transfer destination side, and processes shown in FIG. 9 are executed.

If the bit "TxCopyDC" is equal to "1", as shown in FIG. 8, the bit "TxDCTop" in the control register for transmission is referred to (step S111). If the bit "TxDCTop" is equal to "1", it is recognized that the first quadlet data of the DMA transfer is the top of the packet, the data is transferred, and this fact is also reflected to the transfer destination side (step S112). If the bit "TxDCTCp" is equal to "0", the first quadlet data of the DMA transfer is DMA-transferred together with the DC information (step S113).

After completion of steps S112 and S113, step S114 follows. Whether the data which is DMA-transferred is the last quadlet data or not is discriminated. If the data is not the last data, the processing routine is returned to step S113, and the quadlet data is DMA-transferred together with the DC information.

If it is determined in step S114 that the data which is DMA-transferred is the last quadlet data, the bit "TxDCEnd" in the control register for transmission is referred to (step S115). If the bit "TxDCEnd" is equal to "1", it is recognized that the last quadlet data of the DMA transfer is the end of the packet, the data is transferred, and this fact is also reflected to the transfer destination side (step S116). If the bit "TxDCEnd" is equal to "0", the last quadlet data of the DMA transfer is DMA-transferred together with the DC information (step S117). When the DMA transfer corresponding to the number of quadlet data shown by "DMA_NoTx" in the DMA transfer data register for transmission is finished as mentioned above, the processing routine is finished.

If the bit "TxCopyDC" is equal to "0", as shown in FIG. 9, the bit "TxDCTop" in the control register for transmission is referred to (step S121). If the bit "TxDCTop" is equal to "1", it is recognized that the first quadlet data of the DMA transfer is the top of the packet, the data is transferred, and this fact is also reflected to the transfer destination side (step S122). If the bit "TxDCTop" is equal to "0", the first quadlet data of the DMA transfer is DMA-transferred (step S123). At this time, the DC information on the transferring source side is not transferred.

After completion of steps S122 and S123, step S124 follows. Whether the data which is DMA-transferred is the last quadlet data or not is discriminated. If the data is not the last data, the processing routine is returned to step S123, and the quadlet data is DMA-transferred.

If it is determined in step S124 that the data which is DMA-transferred is the last quadlet data, the bit "TxDCEnd" in the control register for transmission is referred to (step S125). If the bit "TxDCEnd" is equal to "1", it is recognized that the last quadlet data of the DMA transfer is the end of the packet, the data is transferred, and this fact is also reflected to the transfer destination side (step S126). If the bit "TxDCEnd" is equal to "0", the last quadlet data of the DMA transfer is DMA-transferred (step S127). At this time, the DC information on the transferring source side is not transferred.

When the DMA transfer corresponding to the number of quadlet data shown by "DMA_NoTx" in the DMA transfer data register for transmission is finished as mentioned above, the processing routine is finished.

The case of the reception in FIGS. 10 to 12 will now be described. The DMA controller 115 refers to the bit "DMA_startRx" in the control register for reception (step S131). When it is confirmed that the bit "DMA_startRx" is equal to "1", it is recognized that the DMA in the direction of receiving by the payload FIFO 113 is executed. The number of quadlet data which is DMA-transferred is confirmed with reference to "DMA_NoRx" in the DMA transfer data register for reception (step S132).

Subsequently, the bit "SelectRx" in the control register for reception is referred to (step S133). If the bit "SelectRx" is equal to "0", the DMA transfer in the direction from the MRF 112 to the payload FIFO 113 is started (step S134).

If the bit "SelectRx" is equal to "1", the DMA transfer in the direction from the packet FIFO 114 to the payload FIFO 113 is started (step S135).

After completion of steps S134 and S135, the bit "RxCopyDC" in the control register for reception is referred to (step S136). If the bit "RxCopyDC" is equal to "1", it is recognized that this means that the DC information on the transferring source side is transferred to the transfer destination side together with the quadlet data, and processes shown in FIG. 11 are executed. If the bit "RxCopyDC" is equal to "0", it is recognized that this means that the DC information on the transferring source side is not transferred to the transfer destination side, and processes shown in FIG. 12 are executed.

If the bit "RxCopyDC" is equal to "1", as shown in FIG. 11, the bit "RxDCTop" in the control register for reception is referred to (step S141). If the bit "RxDCTop" is equal to "1", it is recognized that the first quadlet data of the DMA transfer is the top of the packet, the data is transferred, and this fact is also reflected to the transfer destination side (step S142). If the bit "RxDCTop" is equal to "0", the first quadlet data of the DMA transfer is DMA-transferred together with the DC information (step S143).

After completion of steps S142 and S143, step S144 follows. Whether the data which is DMA-transferred is the last quadlet data or not is discriminated. If the data is not the last data, the processing routine is returned to step S143, and the quadlet data is DMA-transferred together with the DC information.

If it is determined in step S144 that the data which is DMA-transferred is the last quadlet data, the bit "RxDCEnd" in the control register for reception is referred to (step S145). If the bit "RxDCEnd" is equal to "1", it is recognized that the last quadlet data of the DMA transfer is the end of the packet, the data is transferred, and this fact is also reflected to the transfer destination side (step S146). If the bit "RxDCEnd" is equal to "0", the last quadlet data of the DMA transfer is DMA-transferred together with the DC information (step S147). When the DMA transfer corresponding to the number of quadlet data shown by "DMA_NoRx" in the DMA transfer data register for reception is finished as mentioned above, the processing routine is finished.

If the bit "RxCopyDC" in the DMA transfer control register is equal to "0", as shown in FIG. 12, the bit "RxDCTop" in the control register for reception is referred to (step S151). If the bit "RxDCTop" is equal to "1", it is recognized that the first quadlet data of the DMA transfer is the top of the packet, the data is transferred, and this fact is also reflected to the transfer destination side (step S152). If the bit "RxDCTop" is equal to "0", the first quadlet data of the DMA transfer is DMA-transferred (step S153). At this time, the DC information on the transferring source side is not transferred.

After completion of steps S152 and S153, step S154 follows. Whether the data which is DMA-transferred is the last quadlet data or not is discriminated. If the data is not the last data, the processing routine is returned to step S153, and the quadlet data is DMA-transferred.

If it is determined in step S154 that the data which is DMA-transferred is the last quadlet data, the bit "RxDCEnd" in the control register for reception is referred to (step S155). If the bit "RxDCEnd" is equal to "1", it is recognized that the last quadlet data of the DMA transfer is the end of the packet, the data is transferred, and this fact is also reflected to the transfer destination side (step S156). If the bit "RxDCEnd" is equal to "0", the last quadlet data of the DMA transfer is DMA-transferred (step S157). At this time, the DC information on the transferring source side is not transferred.

When the DMA transfer corresponding to the number of quadlet data shown by "DMA_NoRx" in the DMA transfer data register for reception is finished as mentioned above, the processing routine is finished.

By performing the DMA transfer by using the set information in the DMA control register as described above, a reduction of a processing time at the time when the packet is transmitted and received between the IEEE1394 bus 200 as an external bus and the internal buses 102 and 103 of the IEEE1394 interface apparatus 100 and a reduction of a load on the CPU 121 for control and, further, on the host computer of the electronic apparatus 500 can be realized.

At this time, by using the information of "TxDCTop", "TxDCEnd", "RxDCTop", "RxDCEnd", "TxCopyDC", and "RxCopyDC" in the control register, it is possible to DMA-transmit
① one original packet as one packet as it is,
② one original packet as a plurality of packets,
③ a plurality of packets as a plurality of packets,
④ a plurality of original packets as a plurality of packets as they are, and
⑤ a plurality of packets as one packet.

The DMA transfer described above is used and several methods of data transfer (in case of the transmission to the IEEE1394 bus 200) according to a combination of such a DMA transfer and the writing data transfer by the CPU 121 into three registers of the MTF writing registers mentioned above will now be described with reference to FIGS. 13 to 18.

In FIGS. 13 to 18, "MTFWrite1", "MTFWrite2", and "MTFWrite3" are the MTF writing registers mentioned above. The register "MTFWrite1" is a packet top register. The register "MTFWrite2" is a packet intermediate register. The register "MTFWrite3" is a packet end register.

Figure 13:
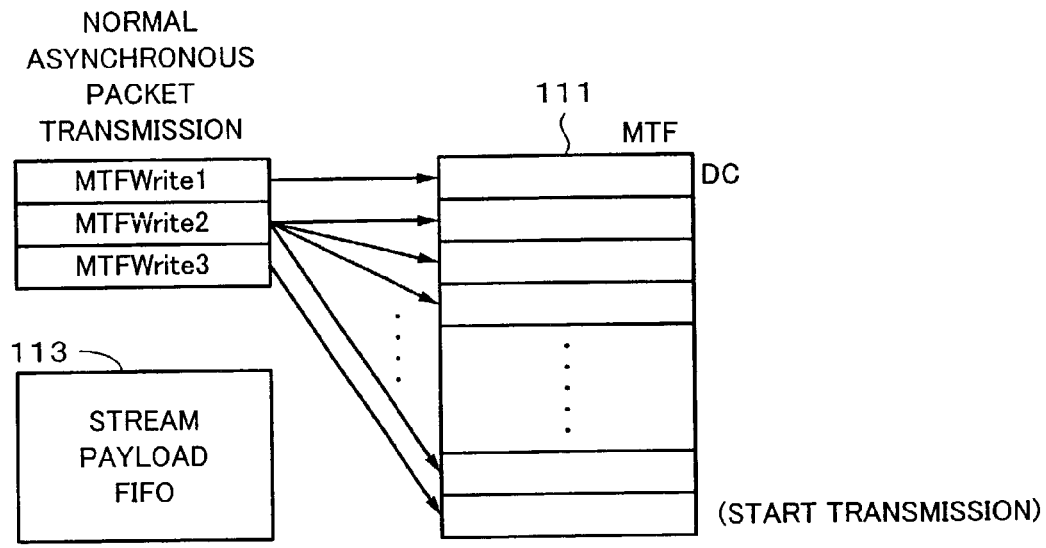
FIG. 13 is a diagram for explaining an example of a method of an asynchronous data transmission in the embodiment of the communication interface apparatus in FIG. 2.

A transfer method of asynchronous data shown in FIG. 13 relates to an example in case of transferring the packet by using only the MTF writing registers without using the foregoing DMA transfer. That is, in the case of this example, first, the CPU 121 writes the top quadlet data of the packet into the MTF writing register "MTFWrite1". Thus, it is transferred as a top of the packet to the MTF 111.

Subsequently, the CPU sequentially writes the second and subsequent quadlet data of the packet into the MTF writing register "MTFWrite2" and transfers them. That is, when one quadlet data is written into "MTFWrite2" and transferred to the MTF 111, the next quadlet data is written into "MTFWrite2" and transferred to the MTF 111. In this manner, the intermediate quadlet data of the packet is sequentially transferred to the MTF 111.

The last quadlet data of the packet is written into the MTF writing register "MTFWrite3". Thus, this data is transferred as an end of the packet to the MTF 111. After completion of the transfer of the last quadlet data of the packet to the MTF 111, the data is sent from the MTF 111 to the IEEE1394 bus 200 via the external interface unit 101.

Figure 14:
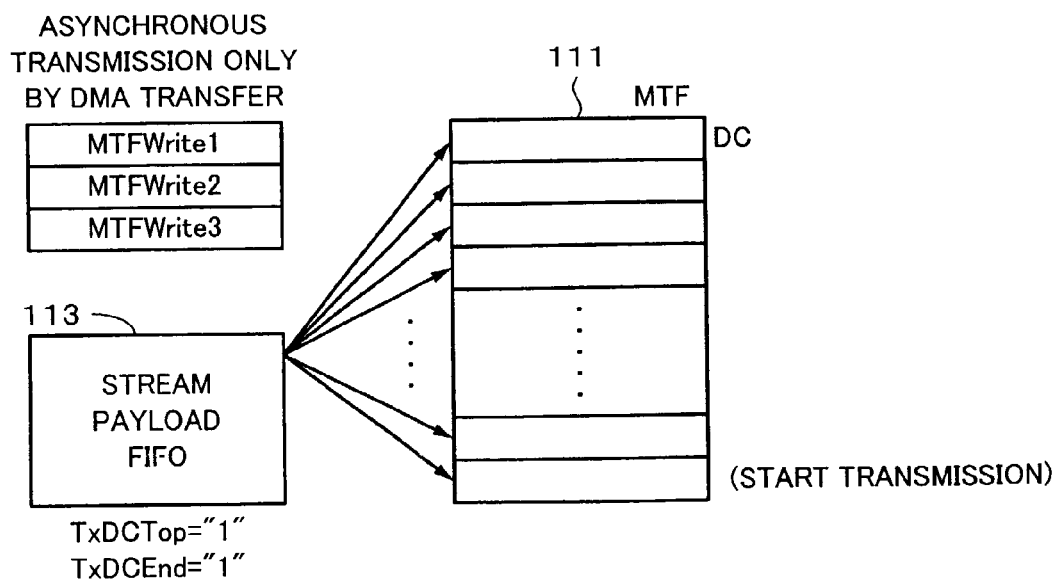
FIG. 14 is a diagram for explaining an example of the method of the asynchronous data transmission in the embodiment of the communication interface apparatus in FIG. 2.

Subsequently, a case of transferring from the payload FIFO 113 to the MTF 111 only by the DMA transfer will be described with reference to FIG. 14. In the case of this example, the bit "SelectTx" in the register for transmission of the DMA control register is set to "0" and each bit of "TxDCTop" and "TxDCEnd" is set to "1". Further, the number of quadlet data which is DMA-transferred is set as "DMA_NoTx" into the register for transmission of the register of the number of DMA transfer data.

When the bit "DMA_startTx" in the register for transmission of the DMA control register is set to "1", the DMA transfer from the payload FIFO 113 to the MTF 111 is executed by the DMA controller 115 on a quadlet data unit basis as mentioned above. At this time, the first quadlet data of the DMA transfer is transferred as a top of the packet and this fact is also reflected to the MTF 111 as a transfer destination side.

After the last quadlet data among the quadlet data of the number shown by "DMA_NoTx" is transferred, it is set to the last data of the packet and this fact is also reflected to the MTF 111 as a transfer destination side. After completion of the transfer of the last data, the data is sent from the MTF 111 to the IEEE1394 bus 200 via the external interface unit 101.

Figure 15:
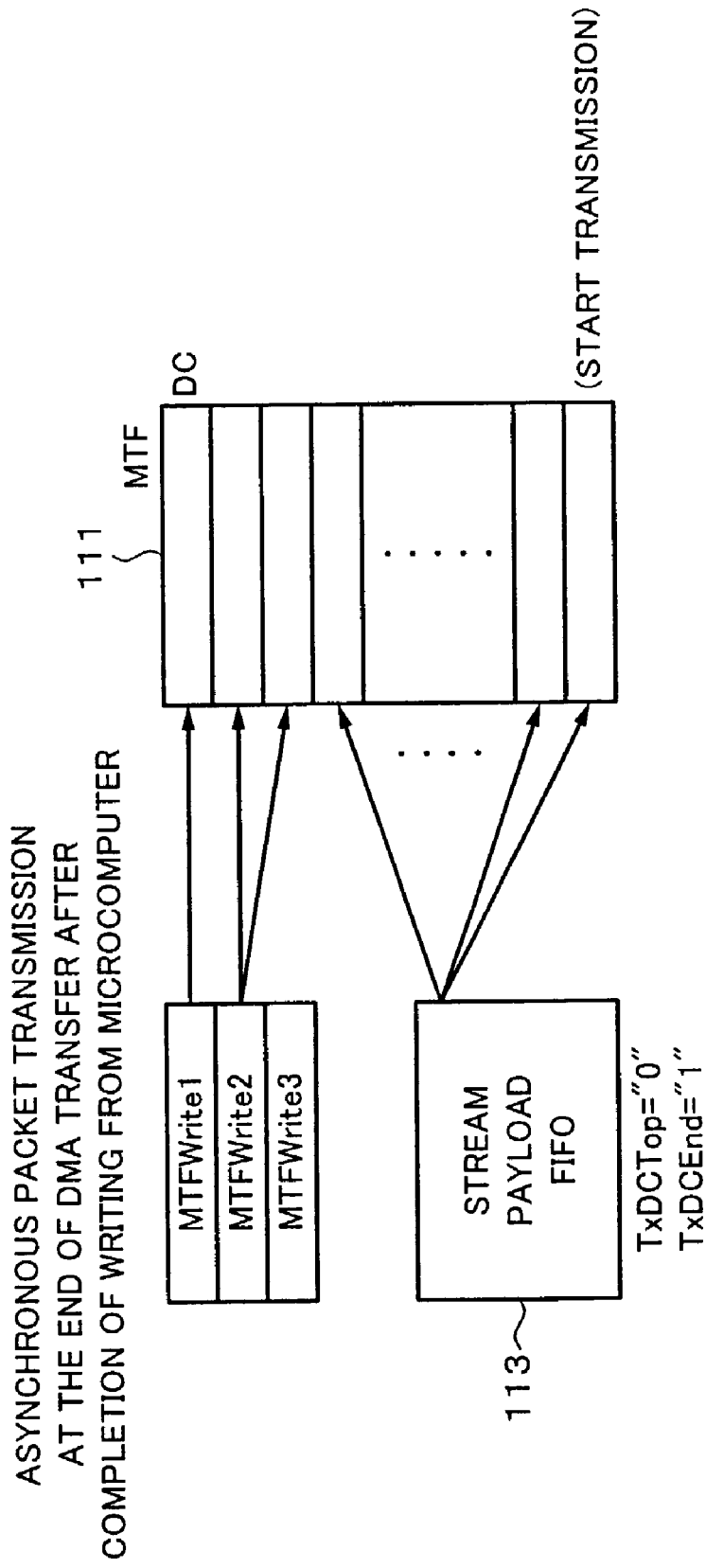
FIG. 15 is a diagram for explaining an example of the method of the asynchronous data transmission in the embodiment of the communication interface apparatus in FIG. 2.

Subsequently, the transfer method of asynchronous data shown in FIG. 15 is a method whereby the packet header is transferred to the MTF 111 by using the MTF writing registers "MTFWrite1" and "MTFWrite2" and the payload data of the packet (data field; hereinbelow, the same shall apply) is DMA-transferred from the payload FIFO 113 to the MTF 111. According to the method of FIG. 15, the last quadlet data of the DMA transfer is transferred as an end of the packet.

In the case of this example, first, the CPU 121 writes the quadlet data of the top of the packet (top of the packet header) into the MTF writing register "MTFWrite1". Thus, it is transferred as a top of the packet to the MTF 111. Subsequently, the CPU sequentially writes the second and subsequent quadlet data of the packet header into the MTF writing register "MTFWrite2" and transfers them to the MTF 111 of the packet header.

By the CPU 121, the bit "SelectTx" in the register for transmission of the DMA control register is set to "0", the bit "TxDCTop" is set to "0", and the bit "TxDCEnd" is set to "1", respectively. Further, by the CPU 121, the number of quadlet data which is DMA-transferred is set as "DMA_NoTx" into the register for transmission of the register of the number of DMA transfer data. This setting operation can be also performed before or after the transfer of the packet header.

After completion of the transfer of the packet header mentioned above, the bit "DMA_startTx" in the register for transmission of the DMA control register is set to "1". Thus, the DMA transfer from the payload FIFO 113 is executed by the DMA controller 115 on a quadlet data unit basis as mentioned above. At this time, since "TxDCTop"="0", the first quadlet data of the DMA transfer is not handled as a top of the packet.

After the last quadlet data among the quadlet data of the number shown in "DMA_NoTx" is transferred, since "TxDCEnd"="1", this data is regarded as last data of the packet and this fact is also reflected to the MTF 111 as a transfer destination side. After completion of the transfer of the last data, the data is sent from the MTF 111 to the IEEE1394 bus 200 via the external interface unit 101.

Figure 16:
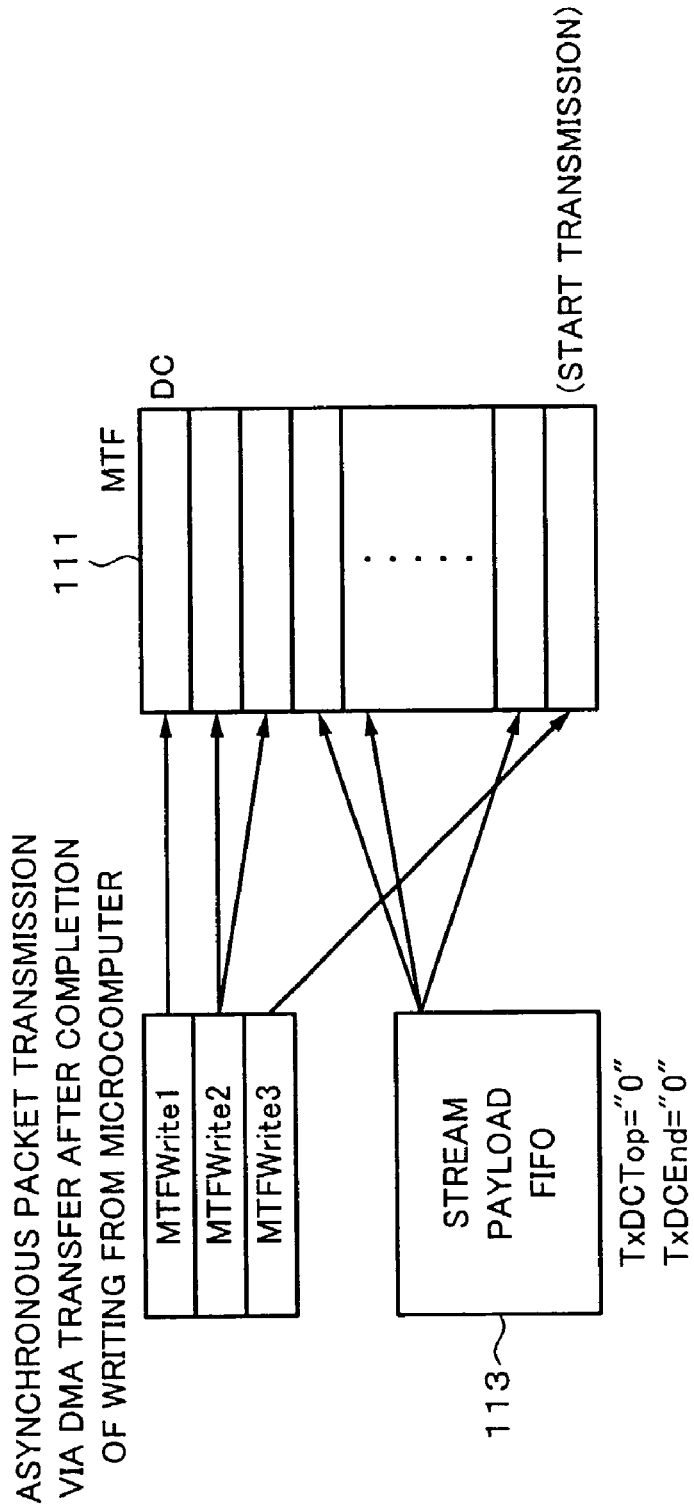
FIG. 16 is a diagram for explaining an example of the method of the asynchronous data transmission in the embodiment of the communication interface apparatus in FIG. 2.

Subsequently, in the transfer method of asynchronous data shown in FIG. 16, the packet header is transferred to the MTF 111 by using the MTF writing registers "MTFWrite1" and "MTFWrite2". The payload data of the packet is DMA-transferred from the payload FIFO 113 to the MTF 111. The last quadlet data of the packet is transferred by using the MTF writing register "MTFWrite3".

In the case of this example, first, the CPU 121 writes the quadlet data of the top of the packet (top of the packet header) into the MTF writing register "MTFWrite1". Thus, it is transferred as a top of the packet to the MTF 111. Subsequently, the CPU sequentially writes the second and subsequent quadlet data of the packet header into the MTF writing register "MTFWrite2" and transfers them to the MTF 111 of the packet header.

By the CPU 121, the bit "SelectTx" in the register for transmission of the DMA control register is set to "0", the bit "TxDCTop" and the bit "TxDCEnd" are set to "0", respectively. Further, by the CPU 121, the number of quadlet data which is DMA-transferred is set as "DMA_NoTx" into the register for transmission of the register of the number of DMA transfer data. This setting operation can be also performed before or after the transfer of the packet header.

After completion of the transfer of the packet header mentioned above, the bit "DMA_startTx" in the register for transmission of the DMA control register is set to "1". Thus, the DMA transfer from the payload FIFO 113 is executed by the DMA controller 115 on a quadlet data unit basis as mentioned above. At this time, the first and last quadlet data of the DMA transfer is not handled as a top and an end of the packet.

After the last quadlet data among the quadlet data of the number shown in "DMA_NoTx" is transferred, the last quadlet data of the packet is written into the MTF writing register "MTFWrite3" and transferred to the MTF 111 by the CPU 121. After completion of the transfer of the last data, the data is sent from the MTF 111 to the IEEE1394 bus 200 via the external interface unit 101.

Figure 17:
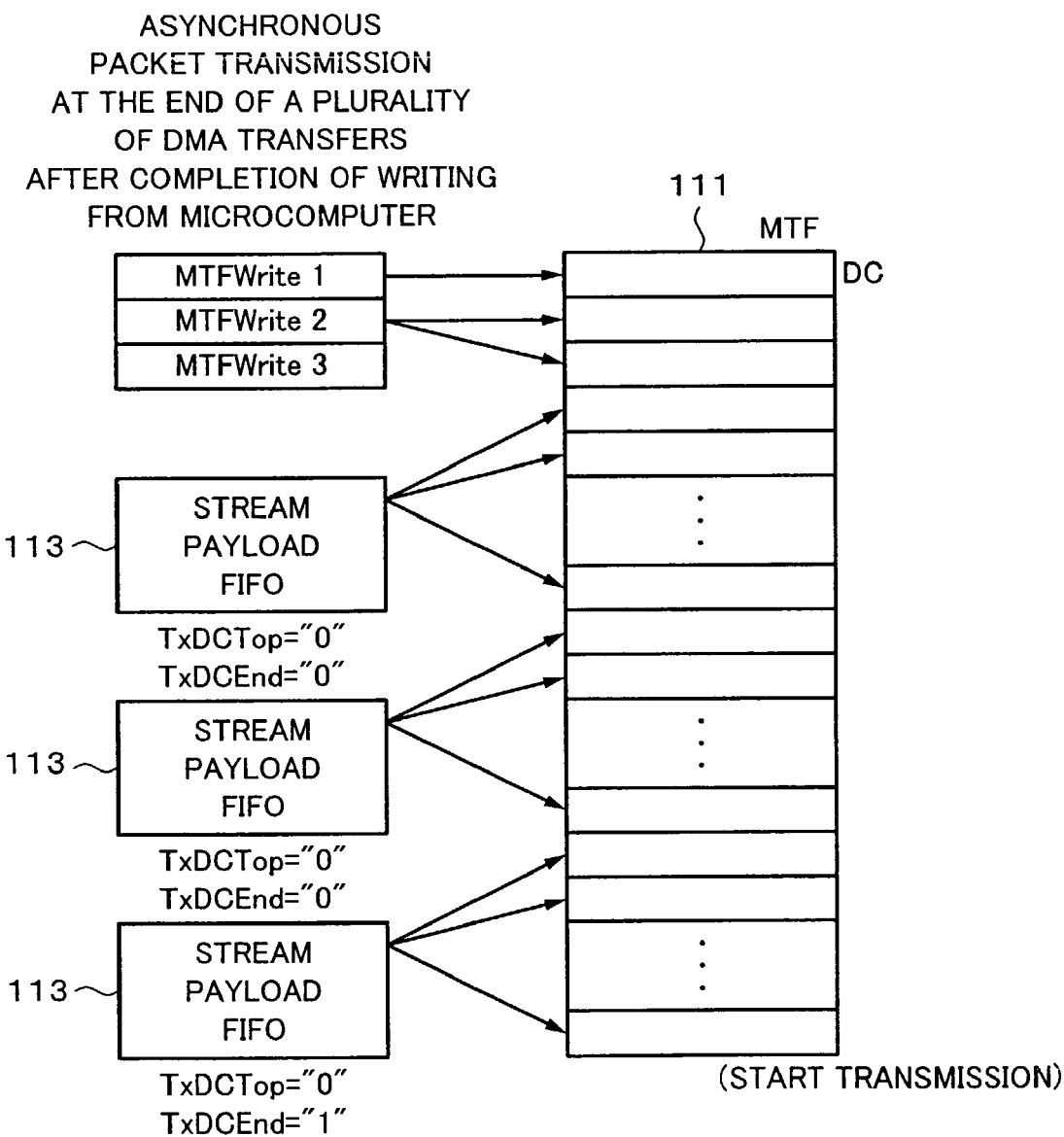
FIG. 17 is a diagram for explaining an example of the method of the asynchronous data transmission in the embodiment of the communication interface apparatus in FIG. 2.

Subsequently, in the transfer method of asynchronous data shown in FIG. 17, the packet header is transferred to the MTF 111 by using the MTF writing registers "MTFWrite1" and "MTFWrite2". The payload data of the packet is transferred from the payload FIFO 113 to the MTF 111 by the DMA transfer of a plurality of number of times (three times in the example of FIG. 17). The last quadlet data of the DMA transfer of the plurality of number of times is transferred as an end of packet.

In the case of this example, first, the CPU 121 writes the quadlet data of the top of the packet (top of the packet header) into the MTF writing register "MTFWrite1". Thus, it is transferred as a top of the packet to the MTF 111. Subsequently, the CPU sequentially writes the second and subsequent quadlet data of the packet header into the MTF writing register "MTFWrite2" and transfers the packet header.

By the CPU 121, the bit "SelectTx" in the register for transmission of the DMA control register is set to "0" for the purpose of performing the DMA transfer of the first time, and the bit "TxDCTop" and the bit "TxDCEnd" are set to "0", respectively. Further, by the CPU 121, the number of quadlet data which is DMA-transferred at the first time is set as "DMA_NoTx" into the register for transmission of the register of the number of DMA transfer data. This setting operation for the DMA transfer of the first time can be also performed before or after the transfer of the packet header.

After completion of the transfer of the packet header mentioned above, the bit "DMA_startTx" in the register for transmission of the DMA control register is set to "1". Thus, the DMA transfer from the payload FIFO 113 is executed by the DMA controller 115 on a quadlet data unit basis as mentioned above. At this time, since "TxDCTop"="0" and "TxDCEnd"="0", the first and last quadlet data of the DMA transfer is not handled as a top and an end of the packet.

After the last quadlet data among the quadlet data of the number shown in "DMA_NoTx" is transferred, for the purpose of performing the DMA transfer of the second time, by the CPU 121, the bit "SelectTx" in the register for transmission of the DMA control register is set to "0". The bit "TxDCTop" and the bit "TxDCEnd" are set to "0", respectively (since these setting contents are the same as those at the first time, this setting operation can be also made to be unnecessary). Further, by the CPU 121, the number of quadlet data which is DMA-transferred at the second time is set as "DMA_NoTx" into the register for transmission of the register of the number of DMA transfer data.

The bit "DMA_startTx" in the register for transmission of the DMA control register is set to "1". Thus, the DMA transfer of the second time from the payload FIFO 113 is executed by the DMA controller 115 on a quadlet data unit basis as mentioned above. Also at this time, the first and last quadlet data of the DMA transfer is not handled as a top and an end of the packet.

After the last quadlet data among the quadlet data of the number shown in "DMA_NoTx" is transferred, for the purpose of executing the DMA transfer of the third time, by the CPU 121, the bit "SelectTx" in the register for transmission of the DMA control register is set to "0". The bit "TxDCTop" is set to "0" and the bit "TxDCEnd" is set to "1" (since only the bit "TxDCEnd" differs from that in the setting contents at the second time, only the bit "TxDCEnd" can be also set). Further, by the CPU 121, the number of quadlet data which is DMA-transferred at the third time is set as "DMA_NoTx" into the register for transmission of the register of the number of DMA transfer data.

The bit "DMA_startTx" in the register for transmission of the DMA control register is set to "1". Thus, the DMA transfer of the second time from the payload FIFO 113 is executed by the DMA controller 115 on a quadlet data unit basis as mentioned above.

After the last quadlet data among the quadlet data of the number shown in "DMA_NoTx" is transferred, since "TxDCEnd" is equal to "1", it is regarded as a last data of the packet. This fact is also reflected to the MTF 111 as a transfer destination side. After completion of the transfer of the last data, the data is transferred from the MTF 111 to the IEEE1394 bus 200 via the external interface unit 101.

Figure 18:
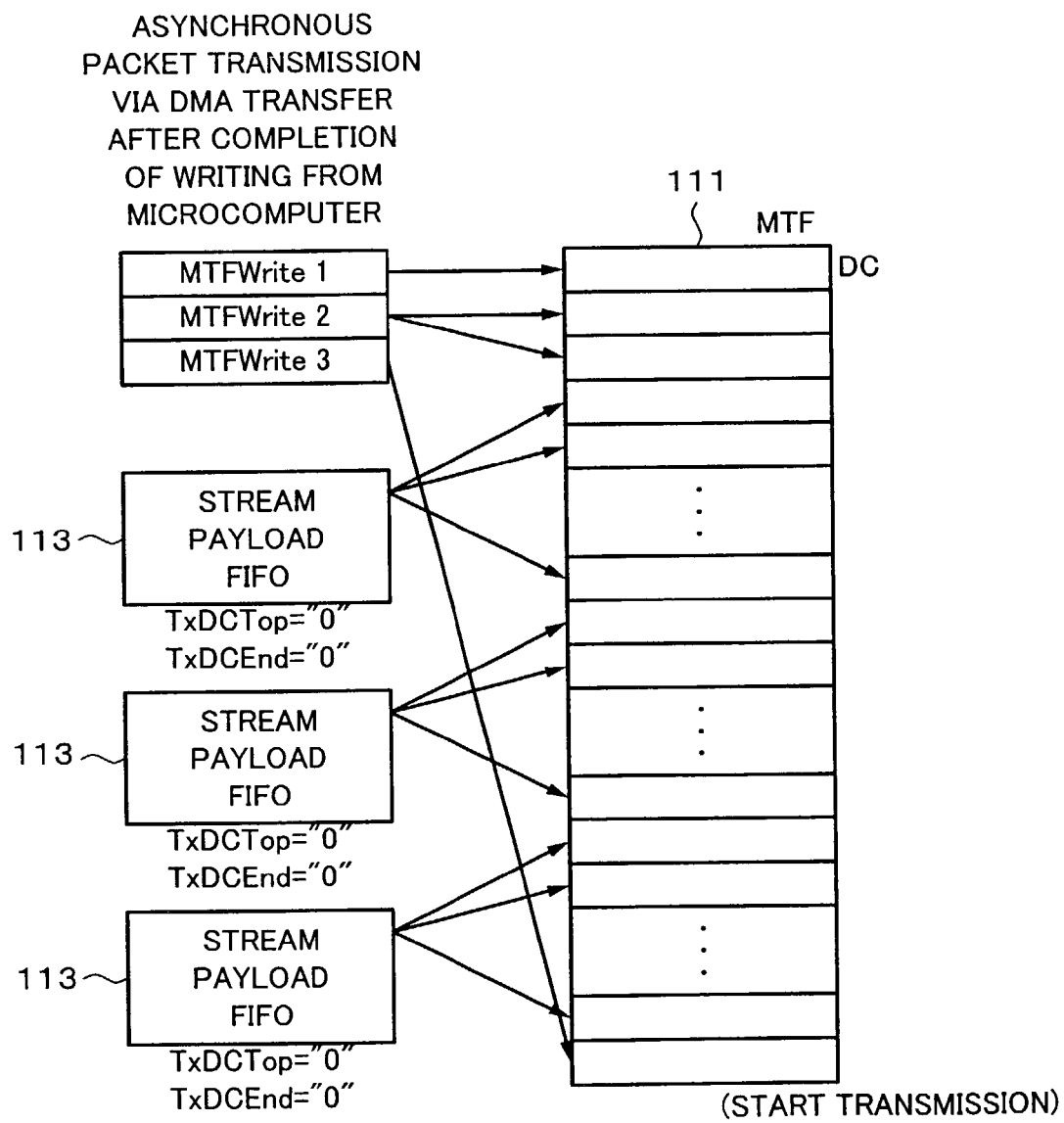
FIG. 18 is a diagram for explaining an example of the method of the asynchronous data transmission in the embodiment of the communication interface apparatus in FIG. 2.

Subsequently, in the transfer method of asynchronous data shown in FIG. 18, the packet header is transferred to the MTF 111 by using the MTF writing registers "MTFWrite1" and "MTFWrite2". The payload data of the packet is transferred from the payload FIFO 113 to the MTF 111 by the DMA transfer of a plurality of number of times (three times in the example of FIG. 18). The last quadlet data of the packet is transferred by using the MTF writing register "MTFWrite3".

In the case of this example, first, the CPU 121 writes the quadlet data of the top of the packet (top of the packet header) into the MTF writing register "MTFWrite1". Thus, it is transferred as a top of the packet to the MTF 111. Subsequently, the CPU sequentially writes the second and subsequent quadlet data of the packet header into the MTF writing register "MTFWrite2" and transfers the packet header.

By the CPU 121, the bit "SelectTx" in the register for transmission of the DMA control register is set to "0" for the purpose of performing the DMA transfer of the first time, and the bit "TxDCTop" and the bit "TxDCEnd" are set to "0", respectively. Further, by the CPU 121, the number of quadlet data which is DMA-transferred at the first time is set as "DMA_NoTx" into the register for transmission of the register of the number of DMA transfer data. This setting operation for the DMA transfer of the first time can be also performed before or after the transfer of the packet header.

After completion of the transfer of the packet header mentioned above, the bit "DMA_startTx" in the register for transmission of the DMA control register is set to "1". Thus, the DMA transfer from the payload FIFO 113 to the MTF 111 is executed by the DMA controller 115 on a quadlet data unit basis as mentioned above. At this time, the first and last quadlet data of the DMA transfer is not handled as a top and an end of the packet.

After the last quadlet data among the quadlet data of the number shown in "DMA_NoTx" is transferred, the setting of the control register for the purpose of executing the DMA transfer of the second time is executed by the CPU 121. In the case of this example, the number of quadlet data which is DMA-transferred at the second time is set as "DMA_NoTx" into the register for transmission of the register of the number of DMA transfer data by the CPU 121.

The bit "DMA_startTx" in the register for transmission of the DMA control register is set to "1". Thus, the DMA transfer of the second time from the payload FIFO 113 is executed by the DMA controller 115 on a quadlet data unit basis as mentioned above. Also at this time, the first and last quadlet data of the DMA transfer is not handled as a top and an end of the packet.

After the last quadlet data among the quadlet data of the number shown in "DMA_NoTx" is transferred, the setting of the control register for the purpose of executing the DMA transfer of the third time is executed by the CPU 121. In the case of this example, the number of quadlet data which is DMA-transferred at the third time is set as "DMA_NoTx" into the register for transmission of the register of the number of DMA transfer data by the CPU 121.

The bit "DMA_startTx" in the register for transmission of the DMA control register is set to "1". Thus, the DMA transfer of the second time from the payload FIFO 113 is executed by the DMA controller 115 on a quadlet data unit basis as mentioned above. Also at this time, the first and last quadlet data of the DMA transfer is not handled as a top and an end of the packet.

After the last quadlet data among the quadlet data of the number shown in "DMA_NoTx" is transferred, by the CPU 121, the last quadlet data of the packet is written into the MTF writing register "MTFWrite3" and transferred to the MTF 111. After completion of the transfer of the last data, the data is sent from the MTF 111 to the IEEE1394 bus 200 via the external interface unit 101.

Figure 19:
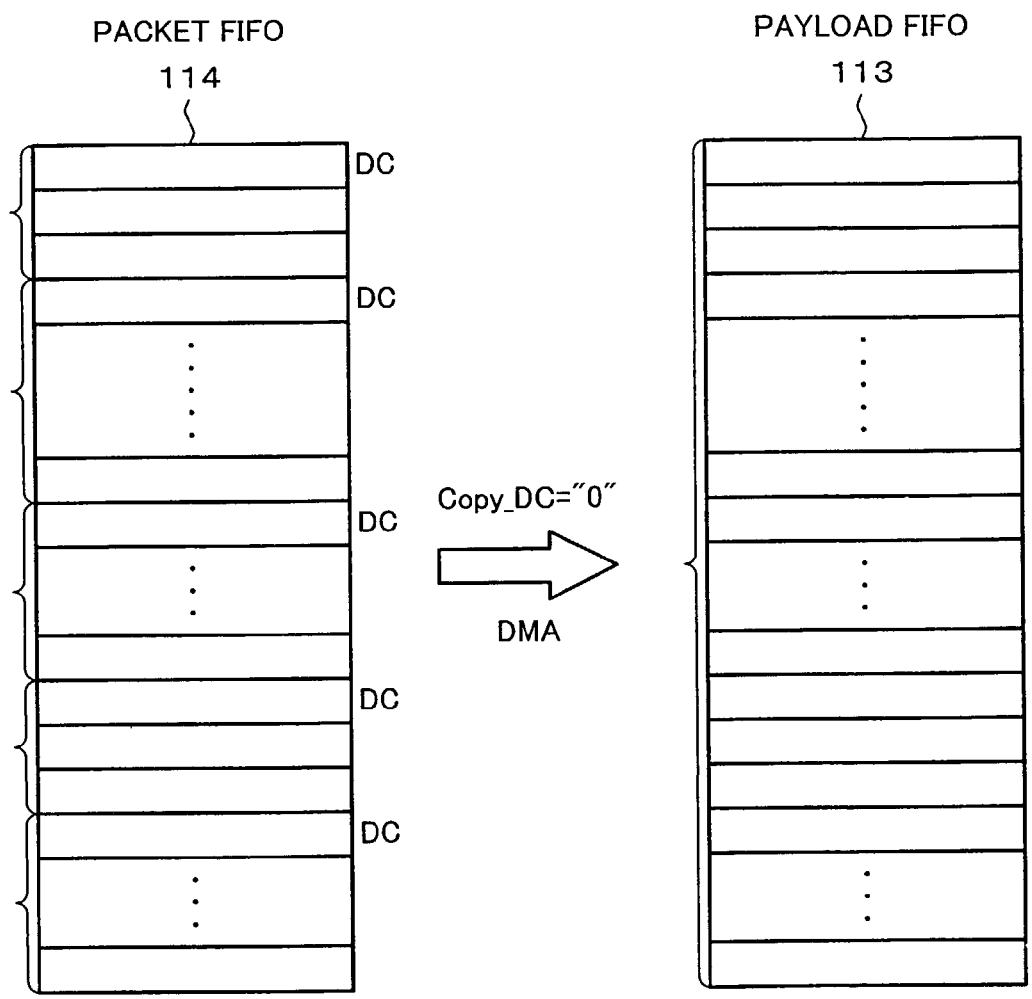
FIG. 19 is a diagram for explaining one of the DMA transfers in the embodiment of the communication interface apparatus in FIG. 2.
Figure 20:
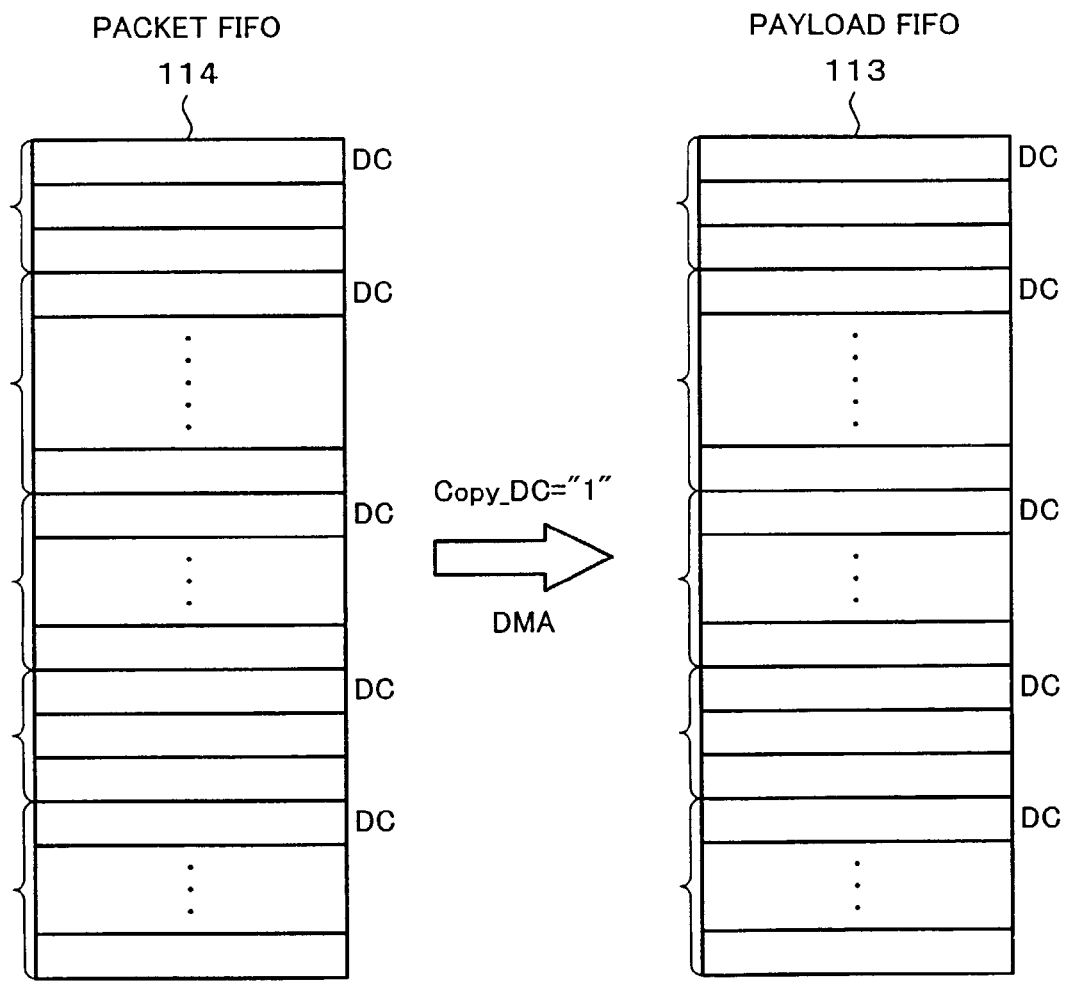
FIG. 20 is a diagram for explaining one of the DMA transfers in the embodiment of the communication interface apparatus in FIG. 2.

FIGS. 19 and 20 are diagrams showing use examples of the bits "TxCopyDC" and "RxCopyDC" in the control register.

The example of FIG. 19 shows a state where the DC information on the transferring source side is not sent but DMA-transferred in the case where a plurality of packets stored in the packet FIFO 114 are transferred to the payload FIFO 113 by the DMA transfer of one time. In this case, the bit "SelectRx" in the register for reception of the DMA control register is set to "0", the bit "RxDCTop" and the bit "RxDCEnd" are set to "0", and the bit "RxCopyDC" is set to "0". Further, by the CPU 121, the number of quadlet data which is DMA-transferred is set as "DMA_NoTx" into the register for transmission of the register of the number of DMA transfer data.

When the bit "DMA_startTx" in the register for transmission of the DMA control register is set to "1", the data is DMA-transferred from the packet FIFO 114 to the payload FIFO 113 every quadlet data. At this time, since "RxCopyDC"="0", the DC information stored in the packet FIFO 114 is not transferred to the payload FIFO 113.

The example of FIG. 20 shows a state where all of the DC information on the transferring source side is sent together and DMA-transferred in the case where the plurality of packets stored in the packet FIFO 114 are transferred to the payload FIFO 113 by the DMA transfer of one time. In this case, by the CPU 121, the bit "SelectRx" in the register for reception of the DMA control register is set to "no", and the bit "RxDCTop" and the bit "RxDCEnd" are set to "0", and the bit "RxCopyDC" is set to "1". Further, by the CPU 121, the number of quadlet data which is DMA-transferred is set as "DMA_NoTx" into the register for transmission of the register of the number of DMA transfer data.

When the bit "DMA_startTx" in the register for transmission of the DMA control register is set to "1", since "RxCopyDC"="1", the data is DMA-transferred together with the DC information from the packet FIFO 114 to the payload FIFO 113 every quadlet data.

Although the data transfer unit of the DMA transfer has been set to the quadlet data in the above description, it is shown as an example and, naturally, the invention is not limited to it.

As described above, according to the invention, in the interface apparatus, since the data is DMA-transferred, the processing time can be shortened and the burden on the microcomputer for control can be reduced.

Various packet transfers such that one packet is transferred as one packet, one packet is transferred as a plurality of packets, a plurality of packets are transferred as a plurality of packets, and the like can be realized.

The invention claimed is:

1. A method comprising:
storing a packet of unit data, obtained from an external bus by asynchronous communication, into a first memory;
transferring the packet stored in said first memory to a second memory via an internal bus by a Direct Memory Access (DMA) transfer;
setting top information indicating that a first unit data which is DMA-transferred from said first memory to said second memory is a top of the packet, and end information indicating that a last unit data which is DMA-transferred from said first memory to said second memory is an end of the packet into a control register;
transferring data obtained by decomposing the packet stored in said second memory to an internal sianal processing system;
packetizing the data from said internal signal processing system;
storing the packetized data into said second memory;
transferring the packetized data stored in said second memory to a third memory via said internal bus by the DMA transfer; and
sending asynchronously the data from said third memory to said external bus,
wherein said DMA transfer is executed in accordance with the settings in said control register, and a setting, in which the top information indicates the top of the packet and the end information indicates the end of the packet, is reflected to a transfer destination of the DMA transfer.

2. The method according to claim 1, wherein the step of setting further includes setting additional transfer information into said control register for instructing whether the information indicative of the top and/or the end of said packet stored in said second memory on a transferring source side is added and whether said DMA transfer is executed.

3. The method according to claim 1, wherein the first memory performs a transmission and a reception of the data to/from an external buss and exceutes said DMA transfer to/from said second memory via an internal bus.

4. An apparatus, comprising:
an internal bus;
first memory means, provided between said internal bus and an external bus, for storing a packet obtained from the external bus by asynchronous communication;
second memory means provided between said internal bus and an internal signal processing system;

third memory means, provided between said internal bus and said external bus, for sending the packet to said external bus by asynchronous communication;

a DMA controller for executing a data transfer between said first memory means and said second memory means and a data transfer between said second memory means and said third memory means by a Direct Memory Access (DMA) transfer;

a control register in which control information for controlling said DMA transfer is stored;

means for decomposing the packet transferred to said second memory means, for re-storing the decomposed packet into said second memory means, for packetizing the data from said internal signal processing system stored in said second memory means, and for re-storing the packetized data into said second memory means;

setting means for setting top information indicating that a first unit data of said DMA transfer is a top of the packet, and end information indicating that a last unit data of said DMA transfer is an end of the packet into said control register; and means for executing said DMA transfer in accordance with the settings in said control register, and when said top information has been set to be the top of the packet and said end information has been set to be the end of the packet, reflecting this fact to a transfer destination of said DMA transfer.

5. The apparatus according to claim 4, wherein said setting means sets addition transfer instruction information into said control register for instructing whether the information indicative of the top and/or the end of said packet stored in said second memory means on a transferring source side is added, and whether the transfer is executed.

6. The apparatus according to claim 4, wherein said first memory means performs a transmission and a reception of the data to/from an external bus and executes said DMA transfer to/from said second memory means via an internal bus.

7. An apparatus, comprising:

an internal bus;

a first memory, provided between said internal bus and an external bus, for storing a packet obtained from the external bus by asynchronous coimnunication;

a second memory provided between said internal bus and an internal signal processing system;

a third memory, provided between said internal bus and said external bus, for sending the packet to said external bus by asynchronous communication;

a DMA controller for executing a data transfer bedveen said first memory and said second memory and a data transfer between said second memory and said third memory by a Direct Memory Access (DMA) transfer;

a control register in which control information for controlling said DMA transfer is stored;

a processor for decomposing the packet transferred to said second memory, for re-storing the decomposed packet into said second memory, for packetizing the data from said internal signal processing system stored in said second memory, for re-storing the packetized data into said second memory, and for setting top information in said control register indicating that a first unit data of said DMA transfer is a top of tbe packet, and end information indicating that a last unit data of said DMA transfer is an end of the packet; and means for executing said DMA transfer in accordance with the settings in said control register, and when said top information has been set to be the top of the packet and said end infonnation has been set to be the end of the packet, reflecting this fact to a transfer destination of said DMA transfer.

* * * * *